United States Patent [19]

Uchida et al.

[11] Patent Number: 5,623,109

[45] Date of Patent: Apr. 22, 1997

[54] PLANT MONITORING AND DIAGNOSING METHOD AND SYSTEM, AS WELL AS PLANT EQUIPPED WITH THE SYSTEM

[75] Inventors: Shunsuke Uchida; Haruo Fujimori, both of Hitachi; Fuminobu Takahashi, Katsuta; Takaharu Fukuzaki, Hitachi; Izumi Yamada, Ibaraki-ken, all of Japan

[73] Assignee: Hitachi, Ltd., Tokyo, Japan

[21] Appl. No.: 247,039

[22] Filed: May 20, 1994

[30] Foreign Application Priority Data

May 21, 1993 [JP] Japan ..................................... 5-119887

[51] Int. Cl.$^6$ ..................................................... G21C 7/36
[52] U.S. Cl. ........................................ 73/865.9; 376/215
[58] Field of Search ..................................... 73/799, 865.8, 73/866, 865.9; 376/215, 216, 245; 364/507

[56] References Cited

U.S. PATENT DOCUMENTS

| 4,803,039 | 2/1989 | Impink, Jr. et al. |
| 5,159,563 | 10/1992 | Miller et al. ............................ 364/507 |
| 5,311,562 | 5/1994 | Palusamy et al. |

FOREIGN PATENT DOCUMENTS

| 0358994A1 | 3/1990 | European Pat. Off. |
| 58-134312 | 8/1983 | Japan |
| 58-215593 | 12/1983 | Japan |
| 63-241876 | 10/1988 | Japan |
| 63-313208 | 12/1988 | Japan |
| 64-51503 | 2/1989 | Japan |
| 2-15306 | 2/1990 | Japan |
| 3-220498 | 9/1991 | Japan |
| 4-134295 | 5/1992 | Japan |
| 4-195300 | 7/1992 | Japan |

Primary Examiner—Robert Raevis
Attorney, Agent, or Firm—Bardehle, Pagenberg, Dost, Altenburg, Frohwitter, Geissler & Partners

[57] ABSTRACT

Plant operating conditions 1, apparatus operating conditions 2 and environment conditions 3 are accumulated, combined and put together as a set of plant status variables 8 -through a monitor 6, while water chemistry information 4 is accumulated as another set of plant status variables 9. The set of status variables 8 is updated and the past data are accumulated in the set of status variables 9. Periodical inspection data 5 are also accumulated in the set of status variables 9 along with the water chemistry information 4. The set 9 is compressed and stored as a plant chart 11 such as a personal clinical chart. A status variable prediction 12 is performed in consideration of the personality of a plant. Both data of the sets 8 and 10 are compared with each other by comparison means 13. If both the data nearly coincide with each other, the plant is diagnosed to be normal and, if not, it is diagnosed to be abnormal. When the plant is diagnosed to be abnormal, an abnormal apparatus and an abnormal factor are identified.

8 Claims, 20 Drawing Sheets

FIG. 5

| MEASUREMENT | INFORMATION | THERMAL POWER |
|---|---|---|
| VOLTAGE AND CURRENT ON GENERATOR | ELECTRIC GENERATING POWER | THERMAL POWER (1) |
| TEMPERATURE PRESSURE AND FLOW RATE OF MAIN STEAM | | THERMAL POWER (2) |
| NEUTRON FLUX | NUCLEAR FISSION RATE | THERMAL POWER (3) |
| CONTROL ROD INSERTED POSITION | | |
| FLOW RATE RECIRCULATED | | THERMAL POWER (4) |
| TEMPERATURE AND FLOW RATE OF FEED-WATER | | |

FIG.17A

| APPARATUS AND EQUIPMENT TO BE DIAGNOSED | | MAIN FUNCTION |
|---|---|---|
| STATIC STRUCTURE / APPARATUS | PRESSURE VESSEL | CONTAINMENT OF HIGH-TEMPERATURE, HIGH-PRESSURE COOLING WATER |
| | MAIN PIPES | CONTAINMENT OF HIGH-TEMPERATURE, HIGH-PRESSURE COOLING WATER |
| | CONTAINMENT VESSEL | AIR TIGHTNESS AND PRESSURE RESISTANCE |
| | REACTOR-INTERNALS | SUSTAINMENT OF RECICULATION FLOW RATE (JET PUMP) |
| | FUEL ASSEMBLY | CONTAINMENT OF RADIOACTIVE FISSION PRODUCTS |
| | COOLING WATER PURIFYING EQUIPMENT | REMOVAL OF IMPURITIES IN COOLING WATER |

FIG.17B

| APPARATUS AND EQUIPMENT TO BE DIAGNOSED | | DIAGNOSING METHOD | | |
|---|---|---|---|---|
| | | OPERATING PERFORMANCE | ABNORMAL SIGNS | MATERIAL DETERIORATION |
| STATIC STRUCTURE / APPARATUS | PRESSURE VESSEL | ■ PRESSURE RESISTANCE, LEAK TEST | ■ NONDESTRUCTIVE INSPECTION | ■ SURVEILLANCE WIRE |
| | MAIN PIPES | | ■ NONDESTRUCTIVE INSPECTION<br>● STEAM LEAK DETECTION | □ SQUID<br>□ ATOM PROBE |
| | CONTAINMENT VESSEL | ■ PRESSURE RESISTANCE, LEAK TEST | | |
| | REACTOR INTERNALS | ● NUCLEAR HEAT BALANCE | ● REACTOR NOISE ANALYSIS | |
| | FUEL ASSEMBLY | ● NUCLEAR HEAT BALANCE | ● OFF-GAS MONITORING<br>■ SIPPING | ■ BURN-UP ANALYSIS AND PERIODIC REPLACEMENT |
| | COOLING WATER PURIFYING EQUIPMENT | ● PRESSURE BRAKE | ○ WATER CHEMISTRY DIAGNOSIS | |

DIAGNOSIS PERIOD  ● : DURING OPERATION  ■ : DURING PERIODICAL INSPECTION
○ : DURING OPERATION  □ : DURING PERIODICAL INSPECTION

FIG. 17C

| APPARATUS AND EQUIPMENT TO BE DIAGNOSED | | MAIN FUNCTION |
|---|---|---|
| MOVABLE APPARATUS | RECIRCULATION PUMP | SUSTAINMENT OF RECIRCULATION FLOW RATE |
| | MAIN STEAM ISOLATION VALVE | EMERGENCY CUT-OFF OF STEAM FLOW |
| | MAIN STEAM SAFETY RELEASE VALVE | EMERGENCY PRESSURE RELEASE |
| | CONTROL ROD DRIVE UNIT | DRIVING AND EMERGENCY INSERTION OF CONTROL RODS |
| | ENGINEERING SAFETY DEVICE | EMERGENCY INJECTION OF HIGH-PRESSURE WATER INTO CORE |
| ELECTRIC INSTRUMENT APPARATUS | IN-REACTOR NEUTRON MONITOR | MEASUREMENT OF NEUTRON FLUX DISTRIBUTION |
| | PROCESS MONITOR | MEASUREMENT OF TEMPERATURE, PRESSURE AND FLOW RATE |
| | REACTOR PROTECTING EQUIPMENT | SHUT-DOWN REACTOR UPON DETECTION OF ABNORMALITY |
| | RADIATION CONTROL EQUIPMENT | MEASUREMENT OF RADIOACTIVITY AND RADIOACTIVE RAYS |

FIG. 17D

| APPARATUS AND EQUIPMENT TO BE DIAGNOSED | | DIAGNOSING METHOD | | |
|---|---|---|---|---|
| | | OPERATING PERFORMANCE | ABNORMAL SIGNS | MATERIAL DETERIORATION |
| MOVABLE APPARATUS | RECICULATION PUMP | ● PRESSURE FLOW RATE MEASUREMENT | ● VIBRATION MONITORING<br>● LOOSENED PART MONITORING<br>● UNMANNED CHECKING DEVICE | |
| | MAIN STEAM ISOLATION VALVE | ● SURVEILLANCE TEST | ■ OVERHAUL CHECK | |
| | MAIN STEAM SAFETY RELEASE VALVE | ● SURVEILLANCE TEST | ■ OVERHAUL CHECK | |
| | CONTROL ROD DRIVE UNIT | ■ OPERATION TEST | ■ OVERHAUL CHECK | |
| | ENGIEERING SAFETY DEVICE | ● SURVEILLANCE TEST | ■ OVERHAUL CHECK | |
| ELECTRIC INSTRUMENT | IN-REACTOR NEUTRON MONITOR | ● NUCLEAR HEAT BALLANCE | ● REACTOR NOISE ANALYSIS | ■ BURN-UP ANALYSIS AND PERIODIC REPLACEMENT |
| | PROCESS MONITOR | ● NUCLEAR HEAT BALLANCE | ● REACTOR NOISE ANALYSIS | |
| | REACTOR PROTECTING EQUIPMENT | ● SURVEILLANCE TEST<br>■ PERIODIC CALIBRATION | | |
| | RADIATION CONTROL EQUIPMENT | ■ PERIODIC CALIBRATION | | |

DIAGNOSIS PERIOD   ● : DURING OPERATION   ■ : DURING PERIODICAL INSPECTION (ALREADY PRACTICED)

FIG.18

| DIAGNOSING SYSTEM | DIAGNOSING METHOD | MAIN SENSORS |
|---|---|---|
| IN-SERVICE INSPECTION (ISI) | DEFECT SEARCH WITH ULTRASONIC WAVE | ELECTRON SCAN ULTRASONIC SENSOR |
| STEAM LEAK DETECTION | MEASUREMENT OF STEAM EJECTION NOISE | AE SENSOR, HIGH-SENSITIVITY MICROPHONE |
| LOOSENED PART MONITORING | MEASUREMENT OF CONTACT NOISE | HIGH-SENSIVITY MICROPHONE |
| CORE NOISE ANALYSIS | EVALUATION OF APPARATUS VIBRATION FROM FLUCTUATIONS IN NEUTRON FLUX IN REACTOR | NEUTRON FLUX MONITOR |
| WATER CHEMISTRY DIAGNOSIS | DETECTION OF APPARATUS ABNORMALITY FROM CHANGES IN PLURAL WATER CHEMISTRY INDICES | DISSOLVED OXYGEN & HYDROGEN METER, CONDUCTIVITY METER, pH METER |
| MATERIAL DEGRADATION DIAGNOSIS | MEASUREMENT OF MINUTE MATERIAL CHANGES | SQUID, ATOM PROBE |

PLANT MONITORING AND DIAGNOSING METHOD AND SYSTEM, AS WELL AS PLANT EQUIPPED WITH THE SYSTEM

BACKGROUND OF THE INVENTION

The present invention relates to a monitoring and diagnosing method and system which monitor and diagnose the condition and operation of plants such as nuclear power plants and thermoelectric power plants.

There are various kinds of plants for producing energy and reaction products, e.g., nuclear power plants using boiling water reactors and pressurized water reactors, thermoelectric power plants in which petroleum, coal, natural gas, etc. are burnt, and chemical plants for producing and refining petrochemicals such as ethylene (hereinafter these different types of plants referred to simply together as plants). In these plants, objects to be controlled are subject to a wide temperature range from low to high temperatures, and phase of the objects is changed from liquid to gas phase and, in some cases, even to solid phase at different locations within each plant.

For each condition of start-up, steady operation and shut-down of a plant, the temperature and phase of the controlled object are variously changed at different locations within the plant. Generally, the operation of a plant is controlled by a computer. In order to achieve optimum operation efficiency of the plant or smooth start-up and shut-down thereof, various variables in the plant such as pressure and temperature are measured every moment, and the plant is operated under control of the computer so that the various variables are optimized.

FIG. 16 is a schematic structural view of main apparatus and equipment of a nuclear power plant using a boiling water reactor.

In FIG. 16, reactor internals such as a fuel assembly and a jet pump 22 are disposed in a pressure vessel 17. The pressure vessel 17 is housed in a reactor containment vessel 16 along with other main apparatus and equipment for controlling and cooling the reactor, such as a control rod drive unit and a recirculation pump motor 29.

During normal operation, control rods are withdrawn from a core 23 so that nuclear fission of uranium as the fuel reaches critical mass to produce heat. The jet pump 22 is driven by the recirculation pump motor 29 disposed in a recirculation loop 26, whereby cooling water is circulated to remove the heat generated by the nuclear fission from the core. Then, high-pressure steam at 280° C. and 6.9 MPa is produced and supplied to a turbine through a main steam line 24 for driving the turbine to thereby generate electricity. The steam is condensed by a condenser into water that is returned to the reactor through a feed-water line 25. During the operation, nitrogen gas is filled into the reactor containment vessel 16 for the purpose of noncombustibility.

If any abnormality should occur in the reactor system, the reactor is shut down and the reactor system is isolated within the reactor containment vessel 16 by operating main steam isolation valves installed inside and outside of the reactor containment vessel 16. Also, any overpressure in the reactor is relieved through a safety release valve 18, and safety equipment such as an emergency core cooling system is operated.

Denoted by reference numeral 21 is a shroud disposed to surround the core 23. Further, 20 is a steamy water separator, 37 is a dry well, and 19 is a steam drier. The steam water separator 20 serves to remove condensed water, and the dry well 37 serves to release a steam/water mixture in the event of loss-of-a-coolant accident. 28 is a coolant purifying pump which supplies a coolant to the feed-water line 25 through a filter/demineralizer 27. 15 is a reactor containment vessel spray for scattering cooling water, and 30 is a similar spray. 31 is a turbine pump for cooling in the event of isolation. In case of the reactor becoming isolated from the turbine system, the pump 31 serves to cool the reactor.

Further, 32 is a residual heat removal unit and 36 is a residual heat removal pump, the heat exchanger 32 and the pump 36 serving to remove the decay heat after shut-down of the reactor. 33 is a high-pressure core spray pump, 34 is a low-pressure core spray pump, and 35 is a pressure suppression chamber.

In the above-described nuclear power plant, the operation of the nuclear power plant is periodically shut down and the main equipment and apparatus are dismantled and disassembled to check for the presence or absence of an abnormality and any degree of deterioration for the purpose of ensuring reliability of the nuclear power plant. Also, the presence or absence of an abnormality is checked in a nondestructive manner and, if any abnormality is found, the relevant apparatus and/or parts are repaired or replaced with new ones, thereby ensuring reliability in the operation of the nuclear power plant. In the nuclear power plant during the operation, the operating condition represented by parameters primarily related to the reactor, such as power, temperature, pressure and flow rate of circulating water, are monitored at all times. Based on the monitored results, it is confirmed that the operating condition of the nuclear power plant is normal. For each of the pumps and other main components, such parameters as rotational speed, delivery pressure, temperature and flow rate are monitored to confirm the operating condition thereof. In addition, not only the vibrations and temperature of each apparatus, but also leaked steam, water, radioactive rays, etc. around the apparatus are monitored to confirm that the environment surrounding the apparatus is normal. Thus, the presence or absence of an abnormality in the operation of the nuclear power plant is always confirmed.

For periodic inspection of the equipment and apparatus, the advanced checking operation is promptly performed by expert workers having advanced skills in conformity with legal check items. FIGS. 17A–17D is a table showing a summary of methods for diagnosing the main apparatus and equipment, and FIG. 18 is a table of main sensors for diagnosis of the main apparatus and equipment (reference: "Equipment Diagnosing System of Nuclear Power Plants", Uchida and three others, Sensor Technology, October 1992, pp. 84–89).

As the prior art relating to monitoring and diagnosis of plants and apparatus, there are known, for example, patent laid-open publications concerned with apparatus (JP, A, 58-134312 and JP, A, 3-220498) and with plants (JP, A, 58-215593, JP, A, 63-313208 and JP, A, 63-241876). In these publications, a prediction model for the operation of an apparatus or plant to be monitored is utilized to detect an abnormality from the difference between the model and actually observed results.

SUMMARY OF THE INVENTION

Meanwhile, it has been recently desired to improve reliability of plants such as nuclear power plants and to increase an availability factor of plants by simplification of the periodic inspection.

There is a fear in the future that as plants such as nuclear power plants are aged year by year, the occurrence of troubles due to deterioration of apparatus and materials over time will lower the reliability of the plant. Also, it is expected that the number of expert workers necessary for the periodic inspection of the plant will be insufficient. It will therefore be necessary to efficiently predict a possibility of the occurrence of an abnormality in apparatus and materials with high reliability during the operation of the plant. It is also required to sense an abnormality of apparatus and so on in the very early stage.

Accordingly, there is a demand for accurate and automatic monitoring and diagnosis of plant equipment which can suppress a reduction in reliability of plants due to deterioration of apparatus and materials over time, can suppress a reduction in the availability factor due to the periodic inspection, and can exactly grasp time-dependent characteristics of plants.

To improve reliability in monitoring and diagnosing highly complicated facilities such as nuclear plants, for example, a function of exactly analyzing and diagnosing an abnormality, taking into account the personality of each plant including its production record, check/repair record and operation record, is indispensable. In addition, not only a function of processing the data to promptly and surely analyze many kinds of and a large number of monitored data and detect an abnormality, but also a function of surely transmitting the result of diagnosis and the measures to be dealt with to operators are also necessary. Then, an overall monitoring and diagnosing system in which the analyzing and diagnosing functions and the transmitting function are coupled to each other is desired.

In the above-described prior art, however, a monitoring and diagnosing method which can exactly analyze and diagnose an abnormality, taking into account the personality of a plant including its production record, check/repair record and operation record, has not yet been realized.

Accordingly, an object of the present invention is to realize a plant monitoring and diagnosing method and system which can exactly analyze and diagnose an abnormality with high reliability, taking into account the production record, the check/repair record, the operation record, etc. of a plant, and can simplify the periodic inspection to increase an availability factor of the plant.

To achieve the above object, the present invention is arranged as follows.

In a plant monitoring and diagnosing method, detecting and accumulating plant operating conditions, apparatus operating conditions and environment conditions, inputting and accumulating plant inspection data, and monitoring and diagnosing plant conditions based on plant record information including the accumulated detection data and inspection data.

In the above plant monitoring and diagnosing method, preferably, the plant record information is stored in the form of a plant chart in which the detection data and the inspection data are compressed and accumulated such as a personal clinical chart, and the plant conditions are diagnosed based on the data in the plant chart.

In the above plant monitoring and diagnosing method, preferably, current plant conditions are predicted in accordance with the data in the plant chart and a plant condition predicting model, and an abnormality in the plant conditions are monitored and diagnosed based on a comparison between the predicted current plant conditions and the current detection data.

Also, in the above plant monitoring and diagnosing method, preferably, when an abnormality is detected as a result of diagnosing the plant conditions, an abnormal location and an abnormal item are identified and events which will ensue from the abnormality are predicted.

In the above plant monitoring and diagnosing method, preferably, the identified abnormal location and item and the event incidental to the abnormality are indicated by display means.

Also, in the above plant monitoring and diagnosing method, preferably, a countermeasure for dealing with the detected abnormality is selected, and the identified abnormal location and item, the event incidental to the abnormality, and the countermeasure are indicated by display means.

Further, in the above plant monitoring and diagnosing method, preferably, a residual life for each plant component, apparatus and member is evaluated based on the data in the plant chart and material degradation data calculated from the chart data.

In a plant monitoring and diagnosing system, the system comprises first input means for receiving detection data of plant operating conditions, apparatus operating conditions and environment conditions, second input means for receiving plant inspection data, first input data processing means for preparing data for use in plant monitoring and diagnosis based on the detection data from the first input means, second input data processing means for preparing data for use in plant monitoring and diagnosis based on the inspection data from the second input means, a plant chart for storing the data prepared by the first and second input data processing means, and monitoring and diagnosing means for monitoring and diagnosing the plant conditions based on the data stored in the plant chart.

In the above plant monitoring and diagnosing system, preferably, the monitoring and diagnosing means includes abnormality diagnosing means for diagnosing a plant abnormality based on the data from the plant chart and the data from the first input data processing means.

Also, in the above plant monitoring and diagnosing system, preferably, the abnormality diagnosing means diagnoses an abnormality in the plant operating conditions and the plant apparatus operating conditions.

Further, in the above plant monitoring and diagnosing system, preferably, the abnormality diagnosing means identifies an abnormal plant location and an abnormal item and predicts ensuring events.

Preferably, the above plant monitoring and diagnosing system further comprises display means for displaying the abnormal location, the abnormal item and the ensuring events identified and predicted by the abnormality diagnosing means.

Also, in the above plant monitoring and diagnosing system, preferably, the abnormality diagnosing means selects a countermeasure for dealing with the location and details of the abnormality, and the display means displays the selected countermeasure.

In the plant monitoring and diagnosing method, plant operating conditions, apparatus operating conditions and environment conditions are detected and accumulated, and detection data are inputted and accumulated. The accumulated detection data and inspection data are stored as plant record information. The plant conditions are monitored and diagnosed based on the plant record information. Therefore, when the record information shows detection of abnormal signs or the like in the past, for example, the monitoring and diagnosis are performed in consideration of the past data even if the current condition is sound. When an abnormality is detected, the location and details of the abnormality are identified and ensuing events are predicted.

In the plant monitoring and diagnosing system, plant operating conditions, apparatus operating conditions and environment conditions are input through first input means. Also, inspection data are input through second input means. Data for use in plant monitoring and diagnosis are prepared by first and second data processing means based on the detection data from the first and second input means. The data prepared by the first and second data processing means are stored in a plant chart. Then, the plant conditions are diagnosed by monitoring and diagnosing means based on the data stored in the plant chart.

BRIEF DESCRIPTION OF THE DRAWINGS

FIG. 5 is a table showing a thermal power diagnosis flow for a large-scaled plant.

FIG. 17A is a table of main apparatus and equipment of a reactor.

FIG. 17B is a table of methods for diagnosing main apparatus and equipment of a reactor.

FIG. 17C is a table of main apparatus and equipment of a reactor.

FIG. 17D is a table of methods for diagnosing main apparatus and equipment of a reactor.

FIG. 18 is a table of main sensors for diagnosis of apparatus and equipment of a reactor.

DETAILED DESCRIPTION OF THE PREFERRED EMBODIMENTS

Figure 1:
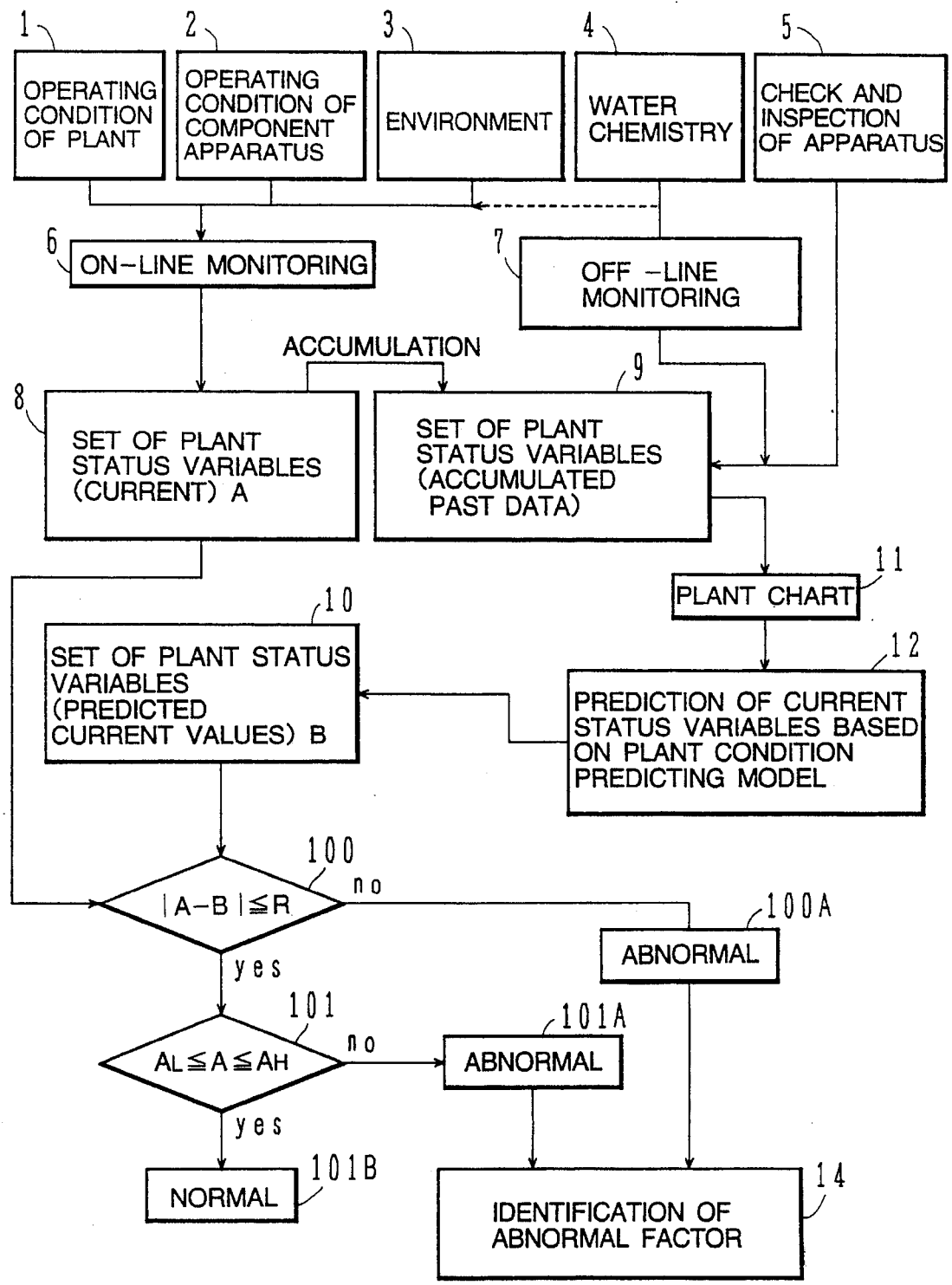
FIG. 1 is a block diagram for explaining the operation of a plant monitoring and diagnosing method according to one embodiment of the present invention.

FIG. 1 is a block diagram for explaining the operation of a plant monitoring and diagnosing method according to one embodiment of the present invention.

In FIG. 1, taking a nuclear power plant as an example, information about an operating condition 1 of the nuclear power plant, an operating condition 2 of each of component apparatus, environment 3, etc. is detected by respective detection means and accumulated in appropriate storage means every moment through an on-line monitor 6. These data are combined and brought together into a set of plant status variables 8. Water chemistry information 4 about cooling water represented by radioactivity and chemical parameters such as dissolved oxygen concentration, pH, conductivity, metal ions, various anions and suspended substances, is detected by respective detection means and measured by respective chemical and radiation ($\alpha$, $\beta$, $\gamma$-ray) analysis through the on-line monitor 6 for part of the information, but through an off-line monitor 7 for most thereof.

The set of plant status variables 8 is exchanged and updated to new data every moment. Past data of the set of plant status variables 8 are accumulated in the storage means as a set of past plant status variables 9. Further, inspection information 5 resulted from an overhaul during the periodical inspection of the nuclear power plant and water quality/chemical information 4 measured by the off-line monitor 7 are also accumulated in the set of past plant status variables 9.

The set of past plant status variables 9 is put together (compressed) into a plant chart 11 and preserved as well as a personal clinical chart. For nuclear power plants, there are models for predicting various conditions of the plant. These models are employed to predict the current condition of the plant based on the past plant data. While the prediction using the models is usually performed based on the plant design data, a status variable prediction 12 in FIG. 1 is performed based on the plant chart 11, i.e., in consideration of the personality of the plant.

Data A represented by the set of plant status variables (current) 8 and data B represented by the set of plant status variables (predicted current values) 10 are compared with each other by comparison means 100. If the equation $|A-B| \leq R$, which indicates the deviation between the data A and B within a certain range of error R, is not satisfied, the plant is diagnosed as abnormal condition 100A. If the equation $|A-B| \leq R$ is satisfied, it is determined by the comparison means 101 whether the data A is within the allowable area ($AL \leq A \leq AH$) or not. Notice that AL is the lower allowable limit and AH is the upper one. If the value of data A is within the allowable range, then the plant is diagnosed as normal condition 101B. If the value of data A is outside the allowable range, then the plant is diagnosed as abnormal condition 101A.

When the plant is diagnosed as including an abnormality, the abnormal apparatus and factor are identified by detailed collation between the data A and B, analysis of the plant chart, and evaluation based on the prediction models. Also, events which might ensue from the abnormality are predicted using the models to clarify the time frame until the countermeasure such as shut-down of the plant or check, repair or replacement of the apparatus should be taken, thereby making it possible to take systematic actions (as indicated by 14).

More specifically, in addition to the characteristic relating to the generation of energy, i.e., the intrinsic purpose of the plant, the relationship among number of revolution, delivery pressure and flow rate of each pump, the relationship between positions of control rods and power, and the correlation among fluctuations in vibration and number of revolution of each pump, temperature fluctuations and power fluctuations are analyzed to evaluate and diagnose whether the abnormality is attributable to change in any characteristic of the individual apparatus or change in the plant characteristics. Whether the operating condition of each of the apparatus and locations is proper or not is checked to diagnose a characteristic deterioration or abnormality for each apparatus and detect abnormal signs. Further, the information about the operating conditions of the individual apparatus is promptly collected and combined mutually to diagnose them for earlier discovery of an abnormality, provide a highly reliable data base, and to prepare the chart of the plant condition automatically.

Such collection and evaluation of the plant data are not limited to for the objects under control of a computer. Information about the operating conditions of all the plant apparatus and information about the specification and inspection data of each apparatus are collected to a central control room or the like and are combined with the operation record and mode of the plant, thereby synthesizing the information.

A description will now be made of the case where the present invention is applied to a nuclear reactor system.

Figure 2:
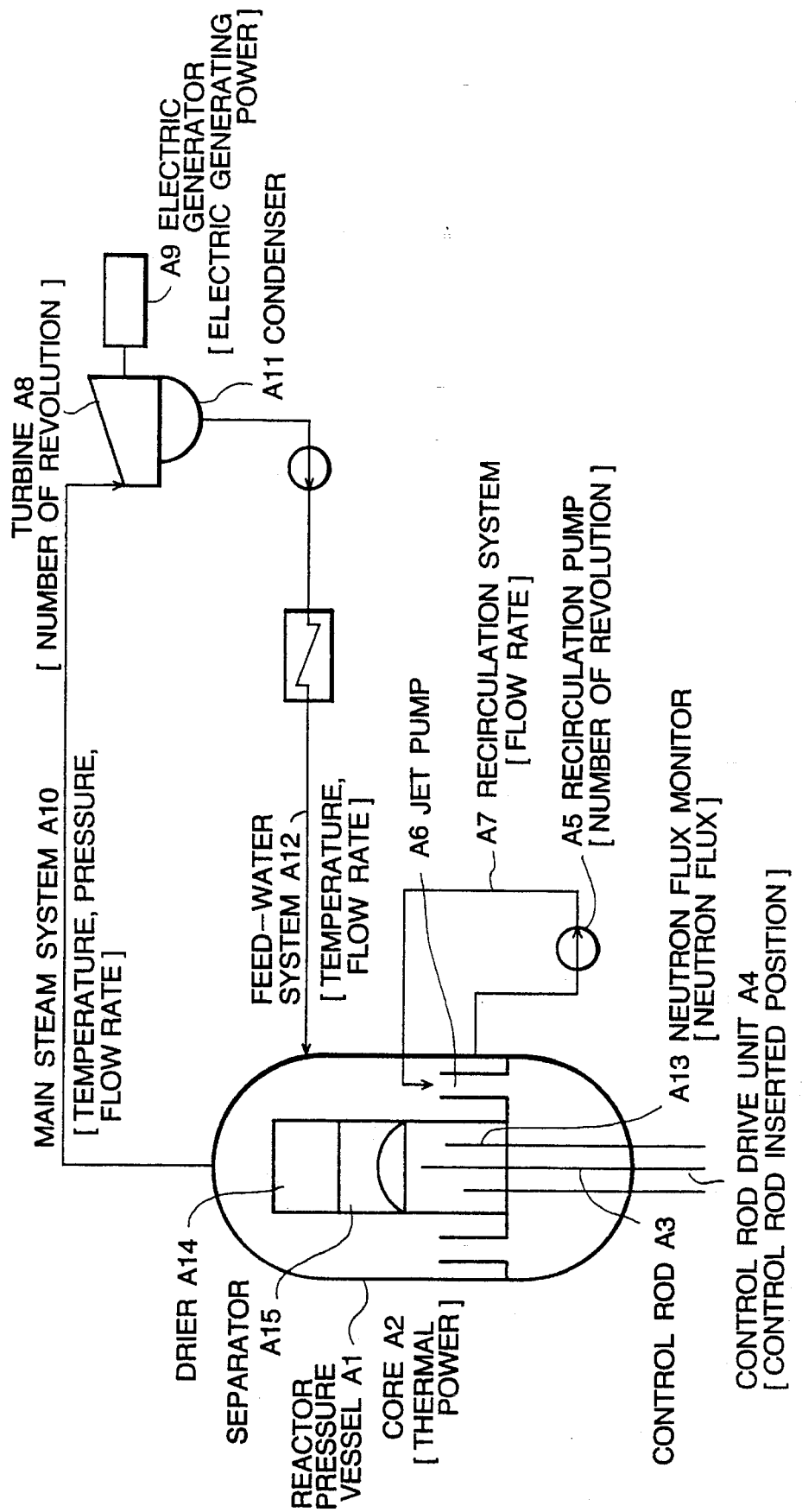
FIG. 2 is a schematic structural view of a nuclear reactor system to which the present invention is applied.

FIG. 2 shows main measuring elements for use in the nuclear reactor system. In FIG. 2, the nuclear reactor system comprises a core A2 made up of fuel assembly in a reactor pressure vessel A1, and a control rod A3 and a control rod drive unit A4 for adjusting reactivity of the core and controlling power. The nuclear reactor system further comprises a recirculation pump AS, a jet pump A6 and a recirculation system A7 for circulating cooling water through the core to cool the core and take thermal energy as steam out of the core, and a turbine A8 and an electric generator A9 for converting thermal energy of the steam generated in the core into electric energy.

Further, the nuclear reactor system comprises a main steam system A10 for introducing the steam to the turbine A8, a condenser A11 for condensing the steam discharged from the turbine A8, and a feed-water system A12 for reinjecting the cooling water, which has been returned to water again in the condenser All, to the reactor. Incidentally, A14 is a drier and A15 is a separator.

The most important parameter indicating the reactor condition is a power of the reactor. The reactor power is usually represented by an electric generating power and a thermal power. While the power directly produced from the reactor is in the form of heat, the reactor power is generally obtained in the form of electric energy for the purpose of generating electricity. In usual BWR power plants, the heat efficiency is slightly fluctuated depending upon, e.g., the temperature of sea water introduced to the condenser, but is approximately 33.3% with the definite correlation existing between the electric generating power and the thermal power. It is generally thought that when the electric generating power is fluctuated, this is resulted from fluctuations in the thermal power.

Gross measurement of the reactor thermal power is made based on the temperature, pressure and flow rate of the main steam. The enthalpy is calculated from the temperature and the pressure, and is then multiplied by the flow rate to calculate the total enthalpy. Since the reactor power is originally produced by nuclear fission in the reactor, the thermal power can also be calculated from a fission rate. Thus, in reactor fluctuations in distribution of the neutron flux and distribution of the fission rate during the operation of the reactor are calculated every moment through nuclear physical calculations for the reactor. A neutron flux monitor A13 disposed in or around the reactor always monitors the neutron flux, and the measured value is used to calibrate the above fluctuation values, whereby the in-core fission rate and the thermal power are calculated with high accuracy. Thus, the thermal power of the reactor is calculated from the neutron measurement.

The thermal power obtained from the neutral measurement (hereinafter referred to as nuclear thermal power) must be coincident with the thermal power calculated from the aforementioned enthalpy of the main steam (hereinafter referred to as macroscopic thermal power). If both the powers do not coincide with each other, this means that an error is caused in the nuclear thermal power or the macroscopic thermal power due to an abnormality or the like in the measuring unit. It is therefore required to find the cause of the error and to obviate the cause. The third parameter for checking which of the nuclear thermal power and the macroscopic thermal power is proper is the aforementioned electric generating power. When two of the three powers (i.e., the nuclear thermal power, the macroscopic thermal power and the electric generating power) coincide with each other, the remaining one is abnormal.

In the case of the reactor, the core reactivity is changed with the operation time. With the elapse of the operation time, there proceeds nuclear fission of U-235 in the fuel assembly loaded in the core. As a result, the fuel assembly are consumed and the fission products produced by the nuclear fission absorb neutrons, whereupon the reactivity is lowered. On the other hand, the reactivity is also lowered not only upon withdrawal of the control rod inserted to the core, but also upon an increase in the flow rate circulated. When the flow rate is increased, the flow rate per power is reduced and the average coolant temperature in the core is lowered, thereby reducing a void fraction in the core. Since BWR has a negative void factor, the reactor power is increased with a reduction in the void fraction. The reduction in the void fraction is also caused with an increase in the flow rate through the feed-water system.

Thus, the thermal power of the reactor is changed upon burn-up of the fuel, withdrawal/insertion of the control rod, an increase/decrease in the flow rate circulated, and an increase/decrease in the flow rate of the feed water. The change rate depends on the design and personality of the plant. In practice, plants are different in their personality even with the same design because of errors in manufacture of each plant. With due consideration paid to the personality of the plant, the thermal power of the reactor can be estimated from the position of the control rod inserted if the flow rate circulated remains the same, or from variations in the flow rate circulated if the position of the control rod inserted remains the same. The thermal power of the reactor thus estimated is also compared with the aforementioned nuclear thermal power, macroscopic thermal power and electric generating power to check the normal operating condition of the reactor from the viewpoint of balance of the entire plant.

Figure 3:
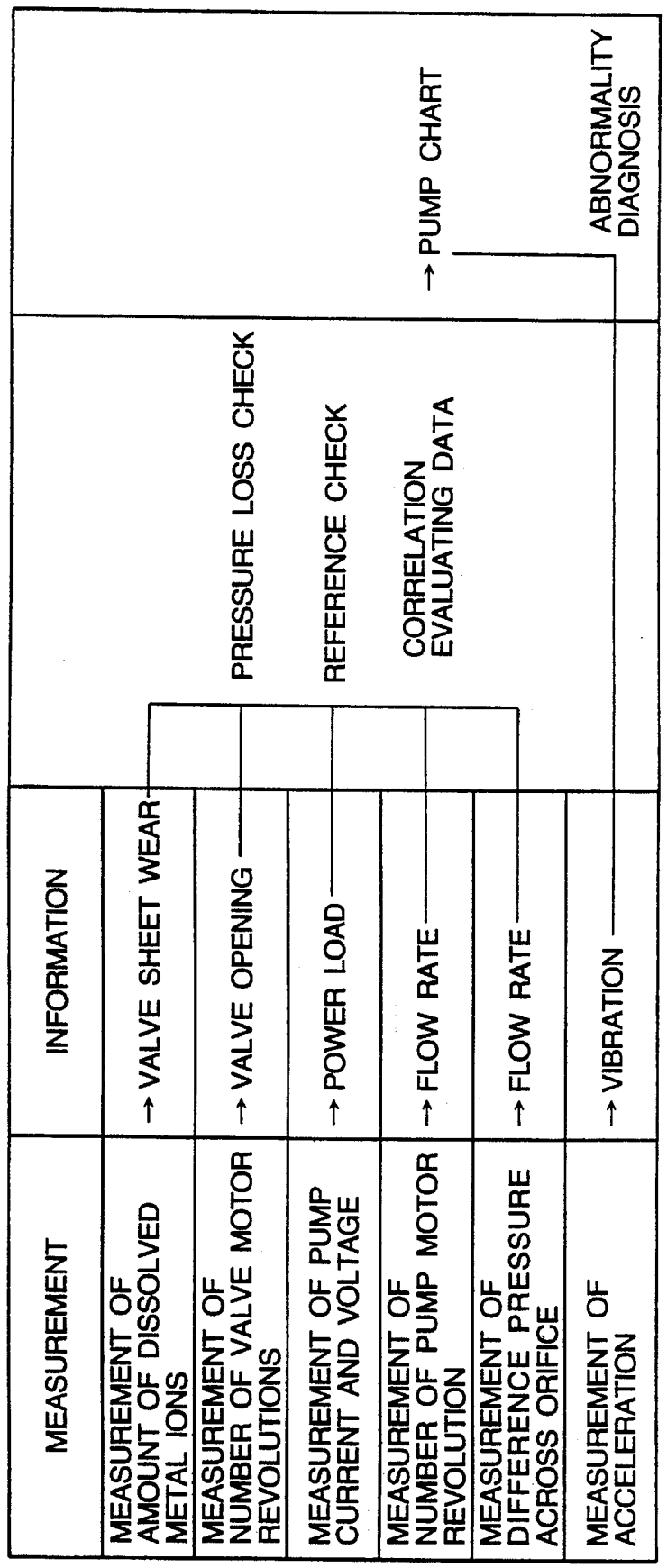
FIG. 3 is a table showing a diagnosis flow for a recirculation pump.

To evaluate the plant balance, characteristic changes in the individual component apparatus are indispensable. FIG. 3 shows one example of a diagnosis flow and a chart of the recirculation pump. More specifically, measurement items include measurement of the amount of dissolved metal ions, measurement of the number of valve revolutions, measurement of the pump current and voltage, measurement of the pump rotational speed, measurement of the difference pressure across an orifice, and measurement of the acceleration. Information obtained from the measurement items includes valve sheet wear information from the measurement of the amount of dissolved metal ions, valve opening information from the measurement of the number of valve revolutions, power load information from the measurement of the pump current and voltage, flow rate information from each of the measurement of the pump rotational speed and the measurement of the difference pressure across an orifice, and vibration information from the measurement of the acceleration. Then, correlation evaluating data are created from the valve sheet wear information, the valve opening information, the power load information, the flow rate information, and the vibration information. These correlation evaluating data are accumulated as a pump chart.

The flow rate recirculated is variable upon change in the number of revolutions of the recirculation pump A5. By calculating the flow rate from the number of revolutions and measuring the flow rate directly from a flow meter, the correlation between the number of revolutions and the flow rate due to fluctuations in the pressure loss in the entire recirculation system is calibrated every moment. These data of the number of revolutions and the flow rate are separately measured in an automatic manner and are preserved as plant data primarily in the form of chart paper. To preserve such raw data as the flow rate data is itself important. However, if those data are preserved as separate data, the data volume stored becomes so large that it is difficult to immediately take out the corresponding data when a check is required upon the occurrence of trouble in some day.

Figure 4:
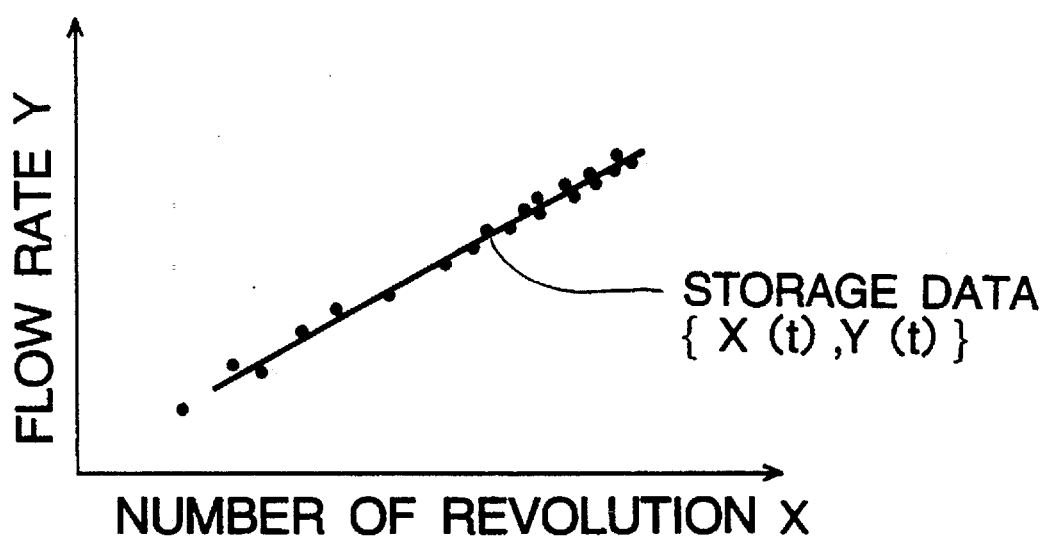
FIG. 4 is a graph showing one example of preserved data for the recirculation pump as a part of the plant chart.

Therefore, the data of the number of revolutions and the flow rate are put together into time-dependent correlation data of both the number of revolutions and the flow rate immediately after the sampling, as shown in FIG. 4, the correlation data being preserved as a chart of the recirculation pump A5. This makes it possible to grasp the pump characteristics and to diagnose an abnormality of the pump. More specifically, in FIG. 4, the vertical axis represents the flow rate Y(t) and the horizontal axis represents the number of revolutions X(t). The time-dependent correlation data between the number of revolutions and the flow rate, as shown, are preserved in a storage. In the correlation analysis therebetween, if a plotted point deviates 10% or more from the correlation specific to the plant, it is judged that any abnormality exists. Such abnormality diagnosis can be used for future estimation of the pump characteristics so that the time at which the abnormality will exceed the allowable characteristic range may be predicted to schedule repair or replacement of the pump till that time.

In addition to the correlation between the number of revolutions and the flow rate, the power consumption, vibrations, noise and valve related data are also included in the chart of the recirculation pump for enabling even slight variations to be evaluated based on a plurality of parameters. Specifically, vibrations are generated in various ways, e.g., in transient states of the number of revolutions and the flow rate, at the number of revolutions and the flow rate above certain values, and after a certain time regardless of the number of revolutions and the flow rate. For the vibration generated regardless of the number of revolutions and the flow rate, it is also required to check reliability of the vibration system itself. For the vibration generated at the number of revolutions and the flow rate above certain values, the correlation among the number of revolutions, the number of vibrations and the magnitude is analyzed and, if a significant correlation is found, the pump is diagnosed as having an abnormality in relation to its rotation.

FIGS. 5 and 6 show one example of a chart for a large-scaled plant. As to the reactor thermal power, as described above, there are;

(1) thermal power estimated from the electric generating power (voltage and current of the generator), (2) thermal power estimated from characteristics (temperature, pressure and flow rate) of the main steam, (3) thermal power estimated from the neutron flux measured value (nuclear fission rate), and (4) thermal power estimated from the position of the control rod inserted, the flow rate recirculated, and feed-water characteristics (feed-water temperature and flow rate).

Figure 6A:
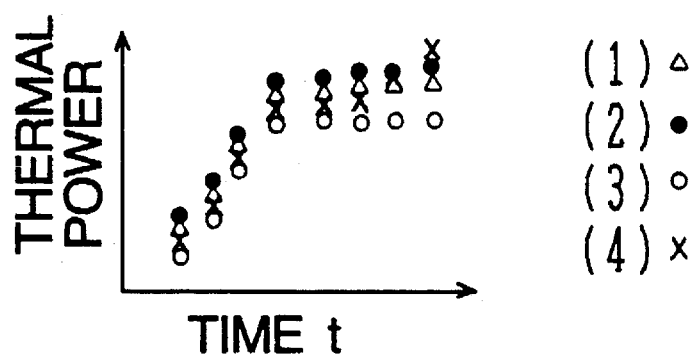
FIG. 6A is a graph showing one example of preserved data for the thermal power diagnosis as a part of the plant chart.

The correlation among these thermal powers (1) to (4) is determined every moment and is put together into a function of the elapsed time or a function of any one of the four thermal powers (1) to (4). In theory, the four thermal powers (1) to (4) should coincide with one another. But even if the respective data have no intrinsic errors, it is usual that the four thermal powers (1) to (4) do not exactly coincide with one another. Whether the individual thermal powers are proper or not is confirmed by checking the data from which the thermal powers are derived and, thereafter, the compressed data are stored as data having been evaluated in the form of a time-dependent function, as shown in FIG. 6(A). In other words, the data of the thermal powers (1) to (4) are stored in the form of a graph in which the vertical axis represents thermal power and the horizontal axis represents the time.

Figure 6B:
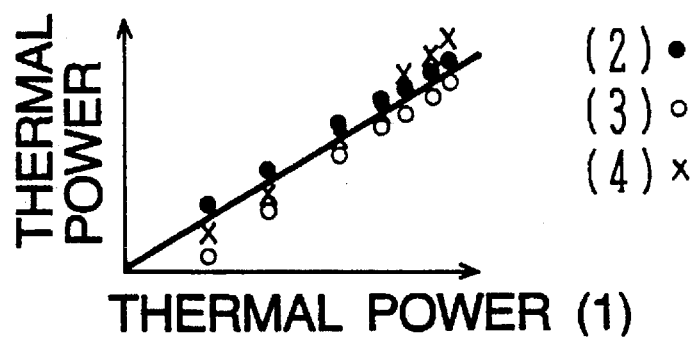
FIG. 6B is a graph showing one example of preserved data for the thermal power diagnosis as a part of the plant chart.

By carefully evaluating whether the shifts between the four thermal powers are changed or not over time and whether the shifts between the four thermal powers are changed or not at the same thermal power, it is possible to find a slight characteristic deterioration of the apparatus (as illustrated in FIG. 6(B)) which can not be judged from only one of the thermal powers.

When the value of the thermal power (4) is significantly larger than the values of the other thermal powers (1) to (3), any of the following events can be thought as a possible reason:

(a) the actual control rod position is shifted from the indicated value toward the withdrawal side, (b) the control rod poison is deteriorated, (c) the jet pump efficiency is lowered, or (d) the fuel reactivity is lowered with an iron crud abnormally adhering to the fuel surface.

The characteristics of the recirculation pump can be confirmed by the above checks. The temperature and flow rate of the feed-water can also be cross-checked, i.e., confirmed by detailed reviews from various angles.

The above events of (a) false indication of the control rod position and (b) poison deterioration can be confirmed by inserting the relevant control rod and withdrawing the other plural control rods one at a time. The above event of (c) lowering of the jet pump efficiency is difficult to check on-line, but a reduction in smoothness of the nozzle inner surface due to deposition of an iron crud onto the nozzle portion, which is thought as one of factors responsible for the efficiency reduction, can be analytically estimated from time-dependent data of the iron crud concentration in the feed-water and the recirculated water. A nozzle clearance failure, block-off by a loosened part, and so on are confirmed by overhaul inspection.

The above event of (d) fuel contamination can also be evaluated from analysis of the iron crud concentration in the reactor water. A set of multi-item data relating to the above (1) to (4) are referred to as a power data pattern. Analysis on time-dependent variations of this pattern is expected to achieve more prompt diagnosis than analysis and evaluation tracing back to the individual original data. In addition, the volume of data to be stored can be reduced. From comprehensive judgment based on the accuracy in measuring the reactor thermal power, the accuracy in calculating the reactor reactivity, the accuracy in measuring the neutron flux and so on, it is appropriate that a decision criterion for determining an abnormality is set to the time at which the measured data deviates or will possibly deviate 10% or more from the correlation specific to the plant.

By comparing the chart with the above plant condition data and carrying out automatic diagnosis using an expert system in parallel, it is possible to promptly detect abnormal signs and identify the abnormal factor with high reliability under flexible adaptation to changes in the characteristics of the plant itself every moment.

Generally, reliability of apparatus and materials used in a plant tend to lower over time. Since the amount of information and reliability of a chart indicating the plant characteristics are increased and improved with the elapse of the plant operation time, the diagnosis accuracy is improved with an increase in the operation time and hence is complimentarily to reliability of apparatus and materials that is lowered with an increase in the operation time.

Furthermore, it is possible not only to inform plant operators of the presence or absence of an abnormality and the abnormal factor in an easily apprehensible manner, but also to promptly and exactly present the gravity of the occasion to the operators by quantitatively predicting incidental events which might occur if the abnormality spreads and then displaying them on the CRT screen.

Additionally, as a result of the prompt and highly reliable detection of abnormal signs and identification of the abnormal factor, the number of equipment and systems subject to the periodical inspection can be reduced, and the equipment and systems to be newly subject to the periodical inspection can be automatically picked up based on the detected deterioration signs.

When displaying the predicted results of the events incidental to the abnormality, the predicted events can be indicated on a display in the form of graphs of related physical variables or moving pictures visually representing the events themselves. This makes it possible for the plant operators to more promptly and exactly grasp the occasion in visual way, and to prevent the occurrence of a trouble, such as escalation of the abnormal condition, due to erroneous judgment of the plant operators. By simultaneously displaying selectable measures to deal with the occasion and results of the measures, it is possible to support selection of the appropriate measure and to create a wide margin for the subsequent measure. The selection of the measure can be made while confirming various situations of the plant on the display.

Moreover, by installing another display in, for example, a monitoring center for monitoring operating situations of plural plants other than the central control room of the relevant plant, the countermeasure can be selected with the aid of judgment by many other concerned people and experts. As a result, even such an abnormal event as not expected can be exactly dealt with after grasping the event more closely.

The plant chart contains the data specific to the plant, i.e., corresponding to the personality of the plant, and exact abnormal diagnosis is enabled depending upon each of plants having different records in production, operation and repair by utilizing the plant chart. By additionally storing trouble occasions in other plants as reference data in the plant chart, those reference data contribute to assisting estimation of the cause of an abnormality and selection of the countermeasure, and to further improving reliability of the abnormality diagnosing system.

Figure 7:
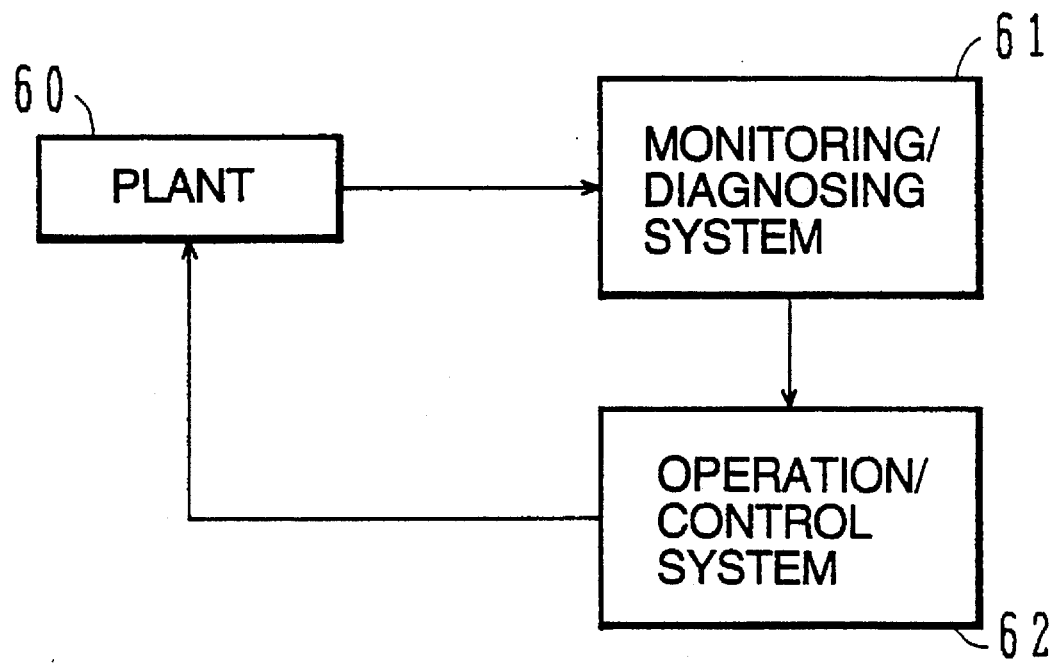
FIG. 7 is a block diagram of an entire plant monitoring and diagnosing apparatus according to one embodiment of the present invention.
Figure 8:
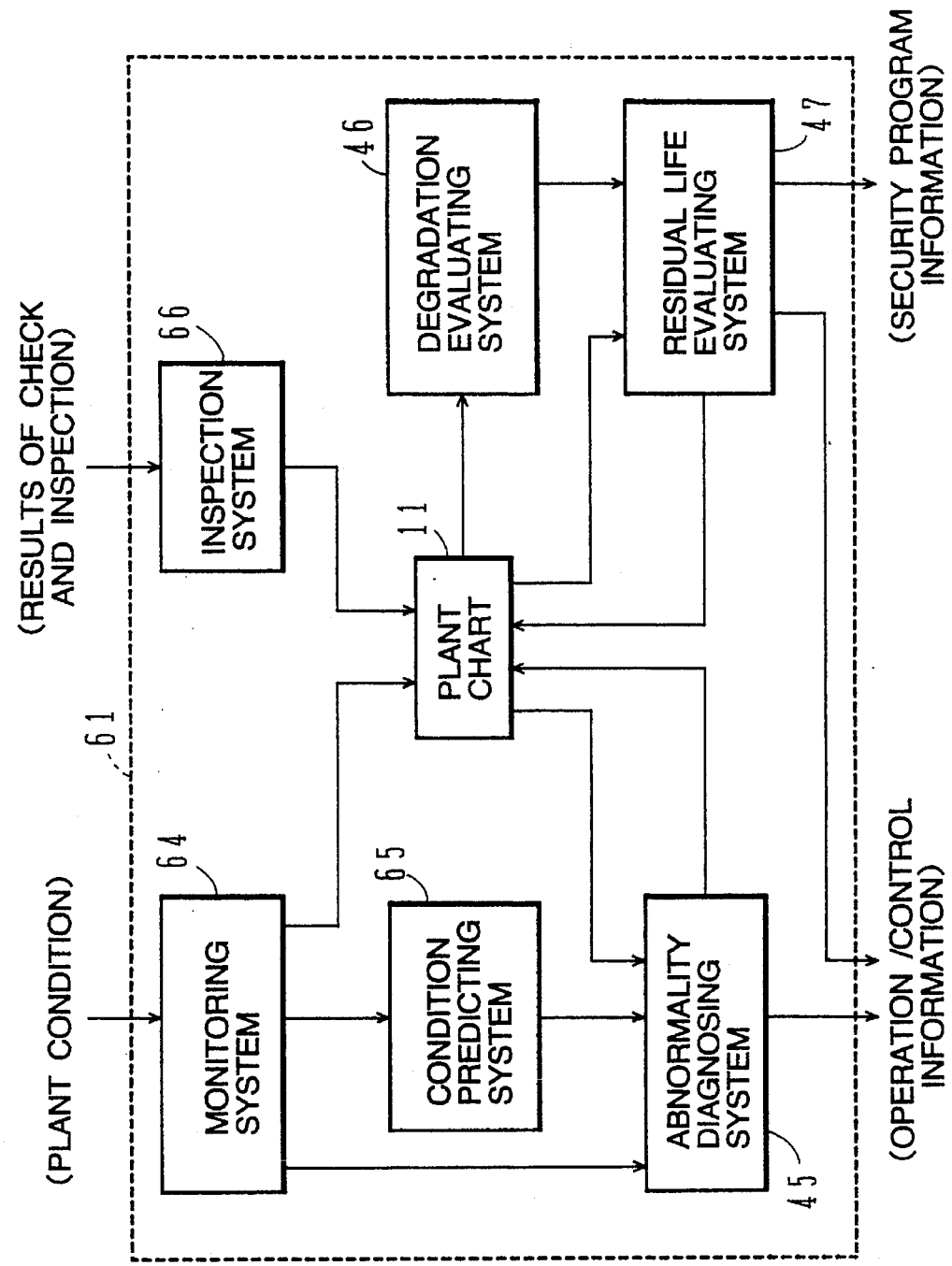
FIG. 8 is a block diagram of the monitoring and diagnosing system in the embodiment of FIG. 7.

FIGS. 7 and 8 are block diagrams of a monitoring and diagnosing apparatus according to another embodiment of the present invention.

Referring to FIG. 7, monitored data from a plant 60 are taken in by a monitoring and diagnosing system 61 including the plant chart 11, and the diagnosis result based on the plant chart 11 is transmitted to an operation/control system 62 for operating and controlling the plant 60. The plant 60, the monitoring and diagnosing system 61, and the operation/control system 62 cooperatively make up a plant in the broad aspect and are all installed in the same site.

FIG. 8 is a block diagram of the monitoring and diagnosing system 61. In FIG. 8, the plant condition monitoring data from the plant 60 are taken in by a monitoring system 64 utilizing various sensors, monitors, etc. and are subject to data processing such as correlation analysis, if necessary. The monitored data thus processed to be suitable for diagnosis are taken in by an abnormality diagnosing system 45, a condition predicting system 65 and the plant chart 11.

Supplied to the plant chart 11 are record information such as about the plant operating condition and the apparatus operating condition through the monitoring system 64, and the inspection results and engineering conditions through an inspection system 66. Then, characteristics specific to the plant, representing the personality of the plant, are accumulated in the plant chart 11 as various kinds of data. Supplied to the abnormality diagnosing system 45 are current operating condition data of the plant or apparatus obtained directly as the monitored data, condition data predicted from the monitored data to be so by the condition predicting system 65 in which prediction models are incorporated, and the plant personality data written in the plant chart 11. Then, the abnormality diagnosing system 45 diagnoses the plant condition based on the operating condition data, the expected condition data, and the personality data.

Further, the data of the plant chart 11 and material degradations quantitated by a degradation evaluating system 46 from the chart data are taken in by a residual life evaluating system 47 which calculates the residual life for each of the apparatus and members using models adapted to analyze deterioration of the material strength and behavior of the crack propagation. The diagnosis and evaluation results by the abnormality diagnosing system 45 and the residual life evaluating system 47 are both supplied to the plant chart 11 as update data. The data from the abnormality diagnosing system 45 and the residual life evaluating system 47 also provide operation/control information. Further, the data from the residual life evaluating system 47 provide security program information.

The abnormality diagnosing system 45 may be arranged such that the weights are allocated depending upon importance of objects to be monitored, such as various apparatus, to diagnoses them in the order of the weights. In this case, it is possible to change the weights depending upon the result of abnormal diagnosis and to supply the changed data to the plant chart 11 as update data.

Figure 9:
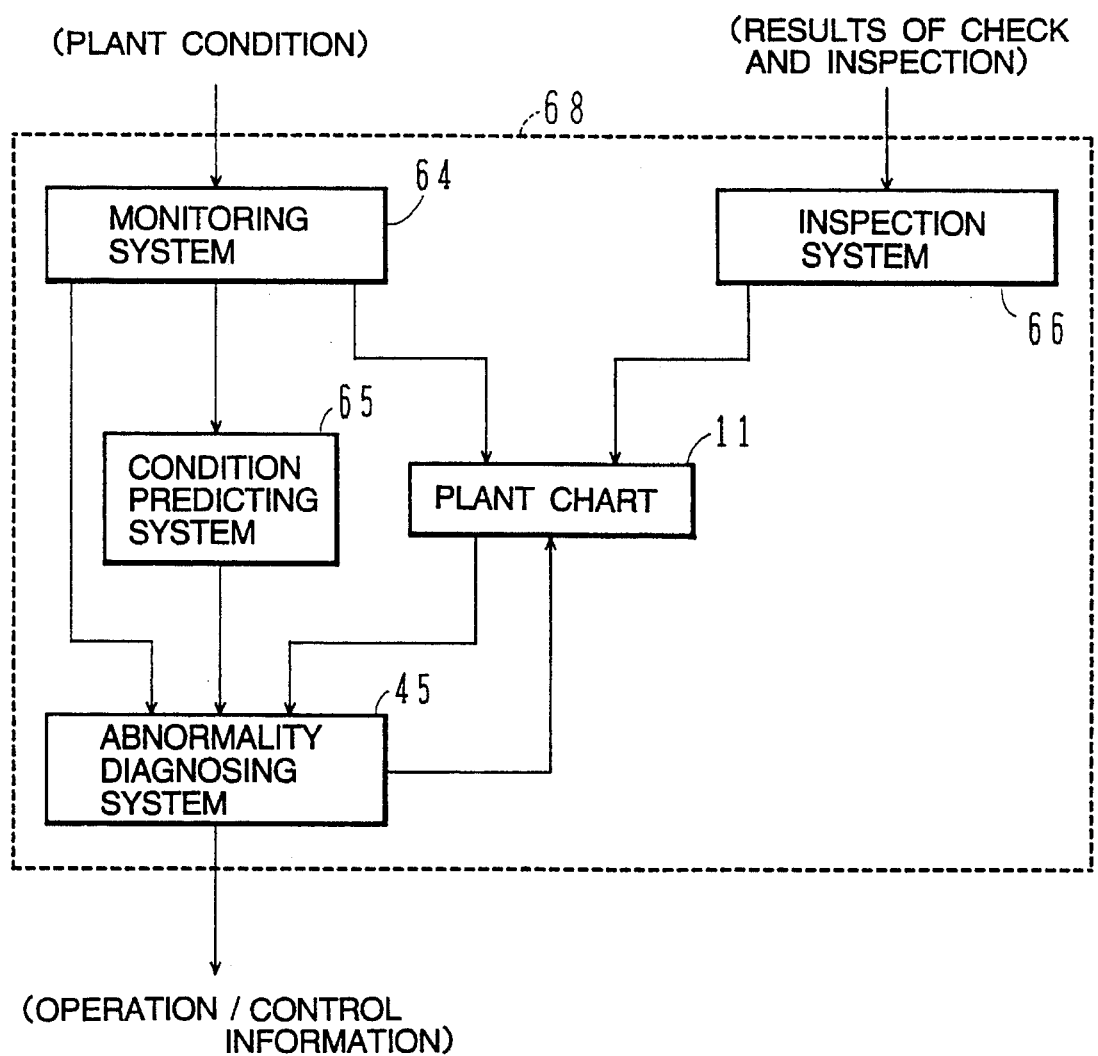
FIG. 9 is a block diagram of another example of the monitoring and diagnosing system.
Figure 10:
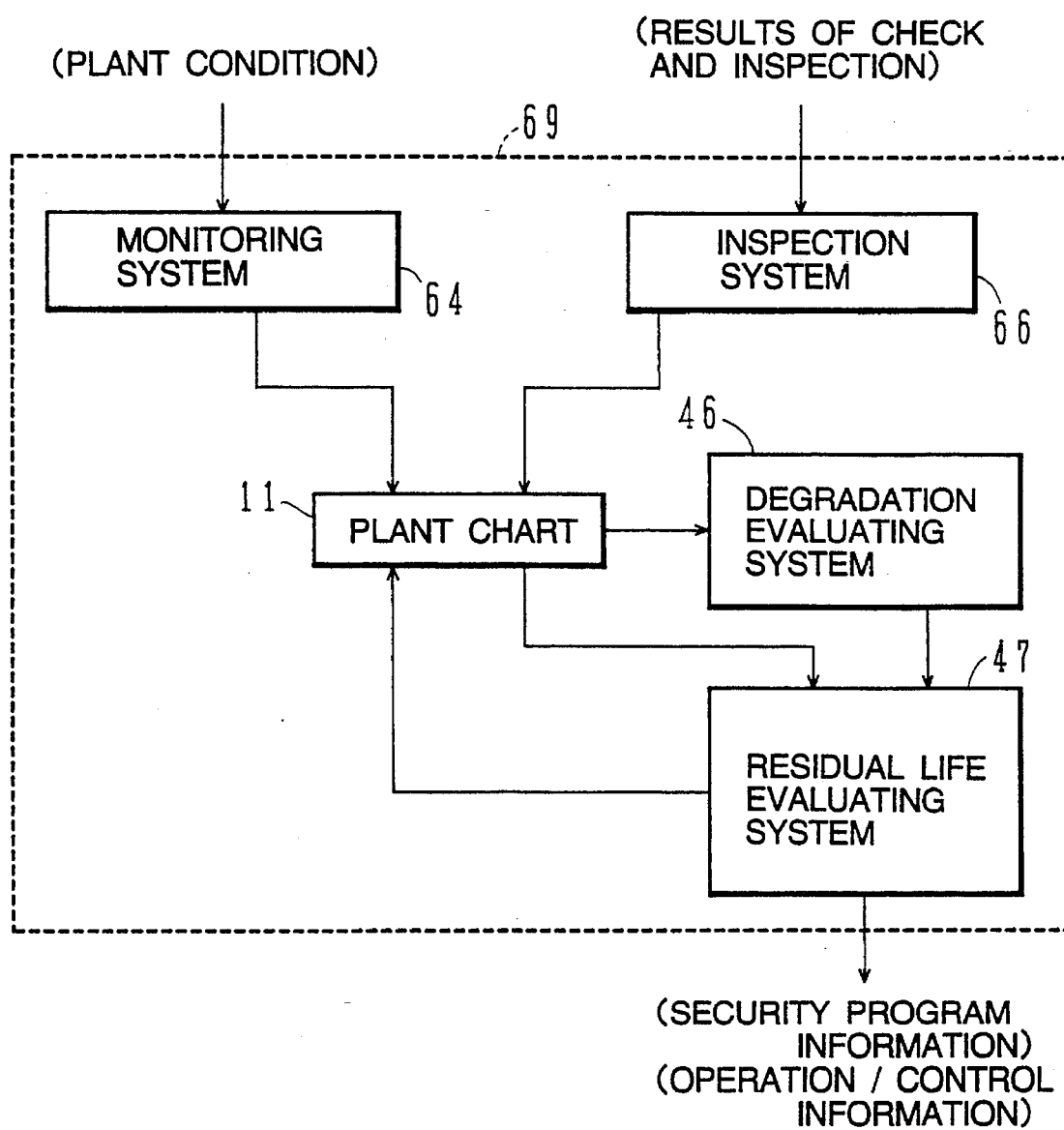
FIG. 10 is a block diagram of still another example of the monitoring and diagnosing system.

FIGS. 9 and 10 show another example of the monitoring and diagnosing system. In FIG. 9, an abnormality monitoring and diagnosing system 68 comprises the monitoring system 64, the inspection system 66, the condition predicting system 65, the plant chart 11, and the abnormality diagnosing system 45. In FIG. 10, a life monitoring and diagnosing system 69 comprises the monitoring system 64, the inspection system 66, the degradation evaluating system 46, the plant chart 11, and the residual life evaluating system 47.

By using the abnormality monitoring and diagnosing system 68 or the life monitoring and diagnosing system 69, shown respectively in FIGS. 9 and 10, as one kind of the monitoring and diagnosing system, the system size can be reduced corresponding to the limited functions. On the other hand, the arrangement of FIG. 8 in which the abnormality monitoring and diagnosing system 68 and the life monitoring and diagnosing system 69 are combined with each other has an advantage of filling up the plant chart 11 to support reliability of the diagnosis result because of the combined systems.

Figure 11:
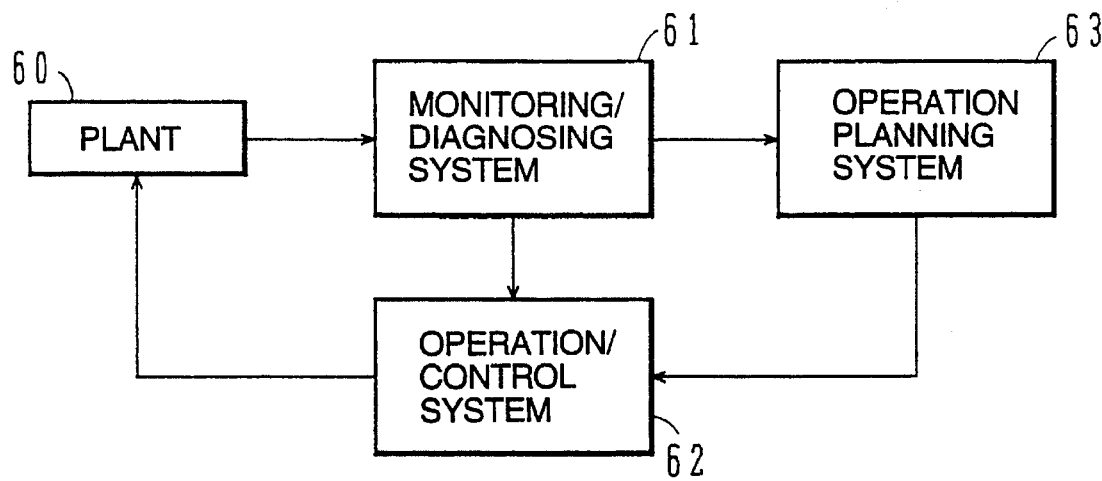
FIG. 11 is a block diagram of an entire plant monitoring and diagnosing apparatus according to another embodiment of the present invention.
Figure 12:
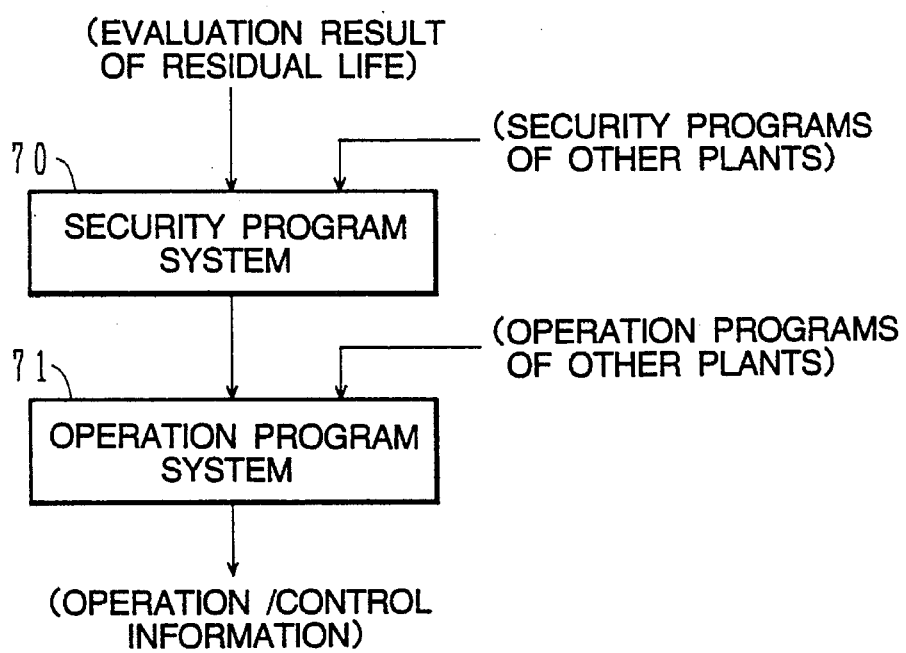
FIG. 12 is a block diagram of an operation planning system in the embodiment of FIG. 11.

Furthermore, as shown in FIG. 11, an operation planning system 63 can be added to the arrangement shown in FIG. 7. The operation planning system 63 takes in the result of the residual life evaluation from the monitoring and diagnosing system 61, prepares a plant security program and a plant operation program based thereon, and supplies the programs to the operation/control system 62. In the operation planning system 63, as shown in FIG. 12, the result of the residual life evaluation from the monitoring and diagnosing system 61 and data from other plants relating to attainment of personals and materials necessary for the security program and the security operation are supplied to a security program system 70 which prepares the security program based on the supplied result and data. Further, an operation program system 71 prepares the operation program using the security program, operation programs of the other plants, and data relating to predicted demand for the plant product, followed by feeding it back to the operation/control system 62.

In FIG. 11, the operation planning system 63 serves to determine countermeasures for a relatively long term. The operation planning system 63 and the residual life evaluating system 47 as part of the monitoring and diagnosing system 61 are not necessarily included in the aforementioned plant of the broad aspect (i.e., installed in the same site as the plant 60), and may be installed in a different place as a facility for handling the operation planning control and the security program.

The arrangement of FIG. 8 will be described in more detail with reference to FIG. 13. Note that the same apparatus, members and so on in the embodiments of FIGS. 1 and 8 are denoted by the same reference numerals.

Figure 13:
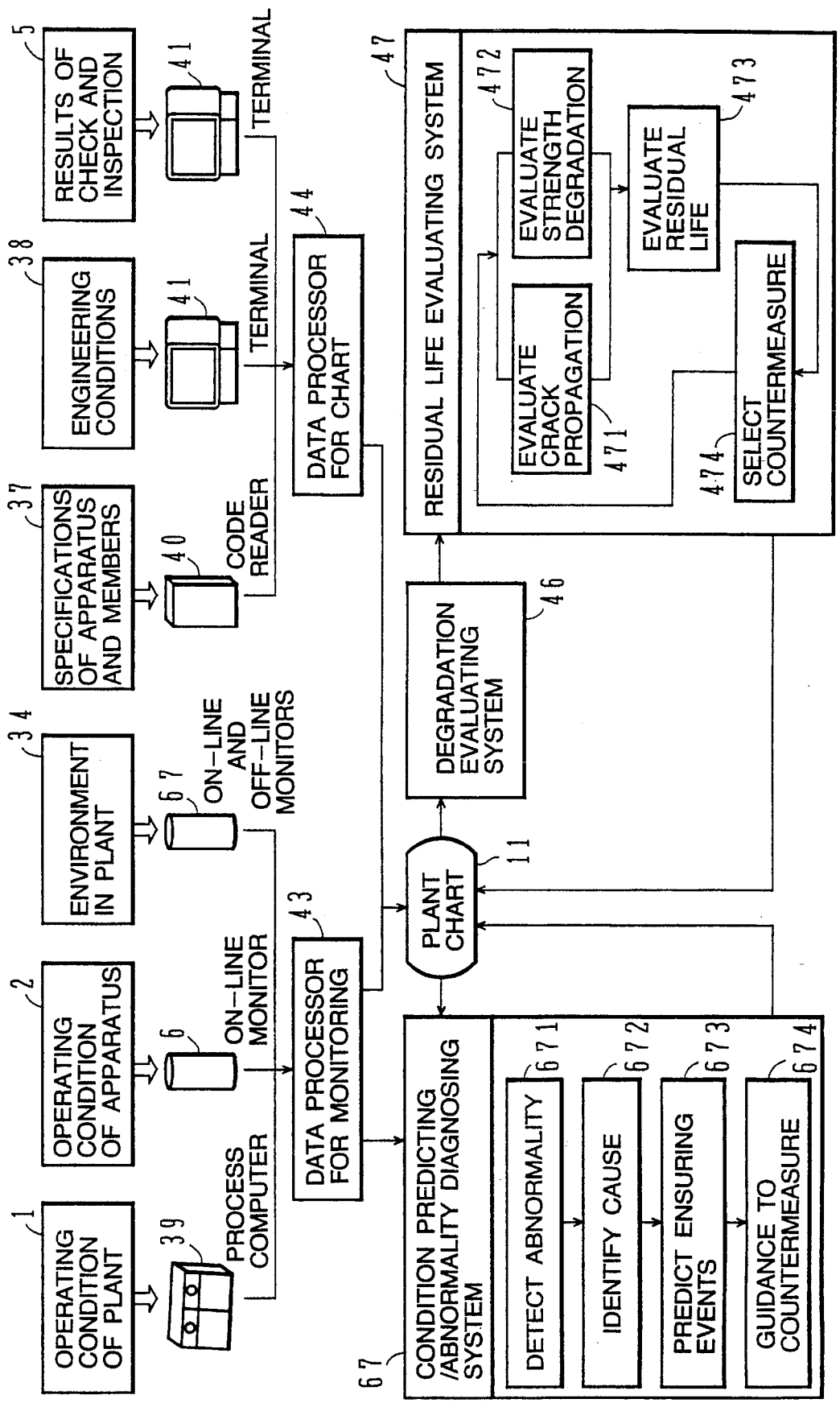
FIG. 13 is a diagram for explaining details of the embodiment of FIG. 8.

In FIG. 13, data such as material, performance and specification data 37 and engineering condition data 38 of apparatus/members, which were installed during construction of the plant, during inspection such as the periodical inspection and during repair/replacement, are input through a terminal 41 of a chart data processor 44 for preparing and sustaining the plant chart 11. The data input during inspection are entered as numerical values for, e.g., constituent elements of materials which can be represented by numerical values, and as codes for attributes such as material names which can not be quantitated. The engineering condition data 38, e.g., the welding condition and so on, are also input in accordance with the set code.

In addition to key entry through a keyboard, data may be input from a recording medium such as a card by using an optical or magnetic code reader 40. By marking respective codes in parts of surfaces of apparatus/members by such means as engraving or printing and inputting those codes using the code reader directly from the apparatus/members themselves as recording media, it is possible to prevent a trouble caused by an accidental missing or mix-up of the recording medium, and to carry out data entry itself quickly and surely. In the case of a nuclear power plant, the above method provides the advantages that the possible problems (of leaving cards or the like in the reactor or increasing contaminants) which may be caused with operators carrying the cards into the reactor can be avoided and radiation exposure can be reduced by a cutdown of the working time. Through the above process, a portion of the plant chart 11 relating to the specification data, etc. of the apparatus/members is automatically updated.

On the other hand, current monitored values of plant operating condition data 1, apparatus operating condition data 2, and in-plant environment data 3 including water quality data 4, as well as trends of the past monitored values thereof are processed by a data processor 43 for monitoring through an on-line monitor 6, an off-line monitor 7 and a process computer 39 to be automatically taken into the plant chart 11. The data taken into the plant chart 11 are not always the monitored signals themselves, but the plural kinds of monitored signals are subject to data processing, such as regression analysis, correlation analysis and frequency analysis, for conversion into advanced monitoring information signals which are then taken into the plant chart 11. This serves to achieve data compression and to increase sensitivity of the monitoring.

Based on the data of the plant chart 11 updated upon occasion and the past and current plant operating condition data obtained from the monitoring system, main factors (material properties, stress and environment) of material deterioration are quantitated in a degradation evaluating system 46. In the case of a nuclear power plant, material properties at the time of installation (or inspection) are evaluated from both the chart data of material properties and compositions of the apparatus/members before the installation (or inspection) and the chart data of engineering conditions such as welding in accordance with an evaluation model prepared beforehand. Further, using the chart data of the plant operating condition such as time-dependent variations in a neutron flux distribution, current and future changes in the material properties such as radiation embrittlement and radiation induced segregation are evaluated in accordance with an evaluation model also prepared beforehand. From the future changes in the material properties, the time of the next periodic inspection, the time of the periodic inspection after the next, etc. are evaluated.

Likewise, as to stress, the residual stress at the time of installation (or inspection) is evaluated from both the chart data of material machining and the chart data of the engineering conditions. Then, using the chart data of the plant operating condition, relaxation and generation of the stress, fluid induced vibration, the thermal stress through the plant operation, etc. are evaluated. As to environment, the radical concentration, the corrosion potential, etc. are evaluated primarily from the current monitored data of the plant operating condition using an evaluation model also prepared beforehand. In the residual life evaluating system 47 which receives the thus-quantitated material degradations as input parameters, crack generation, joining and progress behavior 471 and strength deterioration behavior 472 are analyzed by a residual life evaluating section 473 to predict the remaining lives of the apparatus/members.

Based on the prediction result of the residual life evaluating section 473, a countermeasure selecting section 474 prepares a preventive maintenance program. When the remaining lives predicted in consideration of a safety factor with errors in the various chart data and various evaluation and analysis models taken into account exceed the design lives of the apparatus/members, the security program is not required to be corrected. However, if the predicted residual life is shorter than the design life, the residual life evaluating system 47 selects an optimum preventive maintenance process among from various maintenance processes, such as material properties improvement and stress relaxation by repair/replacement and environmental mitigation, in view of safety and economy. In this case, it is not always required to prolong the predicted residual life up to the design life by only one kind of security engineering process. For example, if hydrogen is first injected to mitigate the corrosive environment in the plant and the repair/replacement is performed in the next periodic inspection, it is possible to avoid shut-down of the plant other than scheduled and to achieve stable supply of electric power.

As to the apparatus/members for use in the repair/replacement, by recording chart information in the form of codes on recording media such as cards beforehand and storing them to provide for preventive maintenance, the recorded information can be utilized as one kind of data base for prompt and proper selection of the optimum engineering process in case of accidental trouble. It is sufficient to perform the residual life evaluation at the frequency of approximately once a month. If the residual life evaluation data of the apparatus/members are also supplied to the plant chart 11 and stored as plant chart data, this is effective in abnormality monitoring from the plant status variables described in the above embodiment. More specifically, the residual life evaluation data can be utilized as supplementary information to confirm abnormal signs estimated from other monitored information, and changes in -trend of those data can also be utilized as plant abnormality monitoring information to improve reliability of the diagnosis result of the abnormality condition predicting/abnormality diagnosing system 67. Likewise, by taking the diagnosis result as well into the plant chart 11, reliability of the evaluation result of the residual life evaluating system 47 can be improved. Incidentally, the condition predicting/abnormality diagnosing system 67 comprises an abnormality detecting section 671, a cause identifying section 672, an incidental event predicting section 673, and a countermeasure guidance section 674.

With the embodiment of FIG. 13, as described above, since the chart data specific to the plant are also updated upon occasion, i.e., at the time of inspection, repair and replacement, and the material degradations are quantitated based on the updated data, the accuracy of evaluating remaining lives of the apparatus/members is improved, and changes in the remaining lives of the apparatus/members due to material deterioration can be early detected to prepare the countermeasure with a wide margin. Therefore, the plant can be safely and economically operated for a long term. Particularly, in a nuclear power plant which requires an extensive maintenance, a corresponding maintenance program can be prepared to be executed in the periodical inspection while avoiding shut-down of the plant other than scheduled, making it possible to assign workers and prepare parts, materials and equipment necessary for repair/replacement with a wide margin, and hence to lighten the inspection work. Further, because of the remaining lives being predicted with high accuracy, when the predicted lives of apparatus/members are sufficiently longer than design lives thereof, the initial repair/replacement program can also be changed so as to prolong the period of use continuously.

Accordingly, it is possible to avoid the preventive maintenance which is neither necessary nor urgent, reduce the period and cost required for periodical inspection of the plant, and to achieve a reduction in the frequency of periodical inspection and an extension of the interval thereof. While the life and reliability are generally increased when only a member such as a pipe is repaired or replaced, there is a possibility that when an apparatus is subject to repair, replacement and/or overhaul check, the occurrence of troubles called initial failures may be increased on the contrary since then. Also, because apparatus characteristics are changed, the data accumulated so far in the plant chart as characteristics specific to the apparatus are totally renewed, which lowers the accuracy of apparatus diagnosis. From this viewpoint as well, therefore, it is desirable to avoid the preventive security operation which has been diagnosed as neither necessary nor urgent. In addition, by allocating costs and persons to other important security operation, reliability of the preventive maintenance can be further improved.

Figure 14:
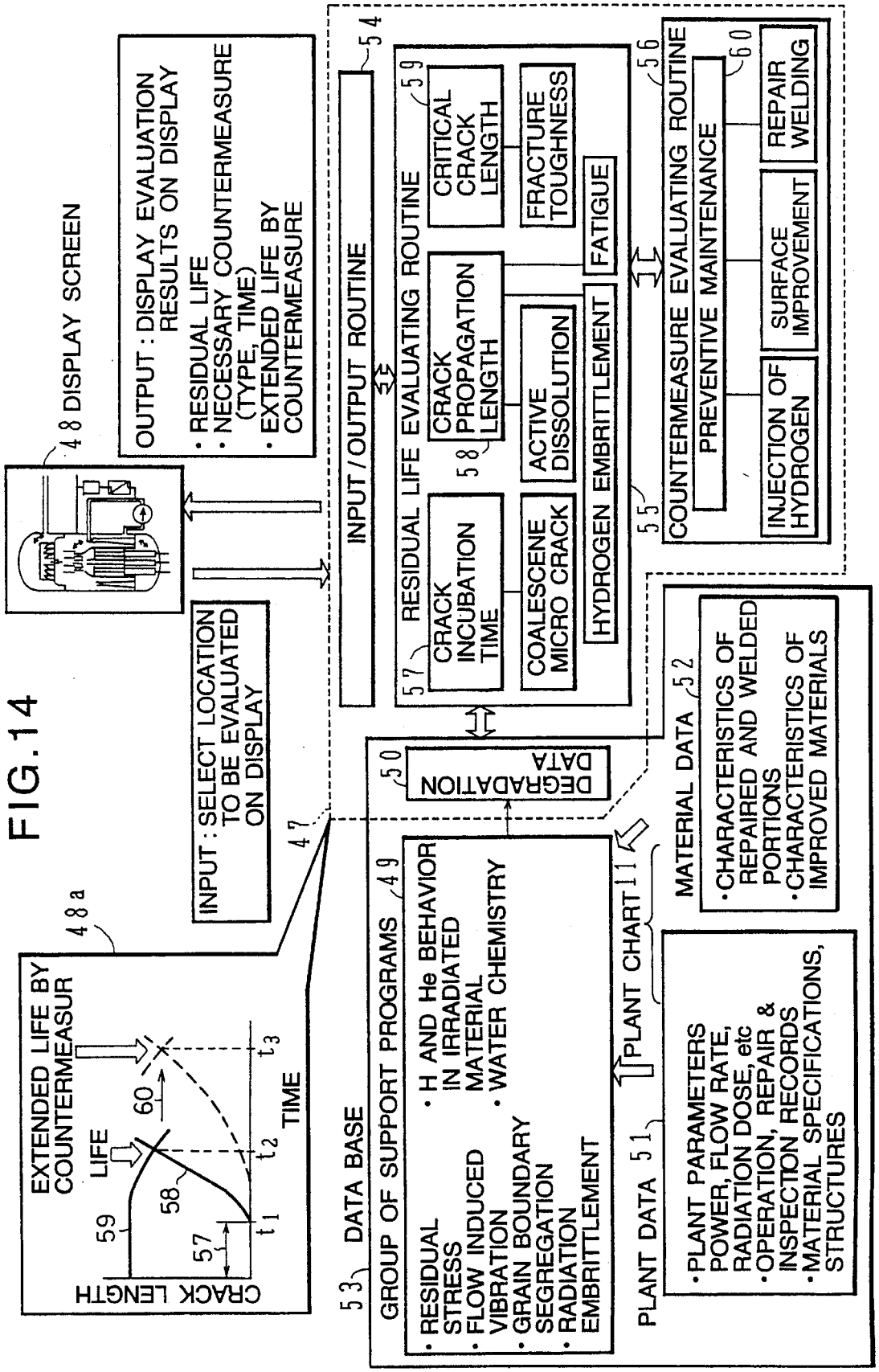
FIG. 14 is a block diagram of a plant monitoring and diagnosing apparatus according to still another embodiment of the present invention.

The result of the residual life evaluation by the residual life evaluating system can be displayed in various ways. By indicating the result on the screen of a display such as CRT, by way of example, it is possible not only to inform plant operators and so on, who are looking at the screen, of the occurrence of future possible trouble in the plant, but also to make them visually understand the urgency of taking any measure and the effect of the measure. More specifically, as shown in FIG. 14, the whole or part of the plant is indicated on a display screen 48 and, by selecting a location of which residual life is to be evaluated, the result of the residual life evaluation on the selected location is displayed. The result can be displayed, e.g., in the form of a graph showing crack progress behavior, or with pseudo-color indication of a residual life distribution in the selected location or surroundings thereof so that the residual life and the location to be dealt with can be visually recognized in a moment. Further, by displaying the kind and time of an applicable security measure, and simultaneously providing the result of the residual life evaluation after implementing the security measure upon selection of the operator, the effect of the countermeasure can also be confirmed.

In the embodiment of FIG. 14, a degradation is quantitated by a group of support programs 49 using the data in the plant chart 11, comprised of plant data 51 and material data 52, to thereby prepare degradation data 50. The plant data 51 include plant parameters (power, flow speed, radiation dose, etc.), operation, repair and periodical inspection records, material specifications, structures and so on. The material data 52 include characteristics of repaired and welded portions, characteristics of improved materials and so an. The group of support programs 49 evaluates such factors as residual stress, flow induced vibration, grain boundary segregation, radiation embrittlement, H and He behavior in irradiated material, and water chemistry in the reactor. The degradation data 50 and the data in the plant chart 11 are combined to make up a data base 53. The residual life evaluating system 47 comprises an input/output routine 54, a residual life evaluating routine 55, and a countermeasure evaluating routine 56.

The input/output routine 54 serves to select the location to be evaluated and to display the evaluation result. The residual life evaluating routine 55 includes, as an inner hierarchy, a crack incubation time evaluating routine 57, a crack propagation length evaluating routine 58, and critical crack length evaluating routine 59. The crack incubation time evaluating routine 57 evaluates the time until microscopic cracks coalesce together through repeated breakdown and repair of the surface oxide film to become a macroscopic crack which steadily propagates. The crack length evaluating routine 58 evaluates a crack propagation length from the crack propagation rate, based on active dissolution, hydrogen embrittlement, fatigue, etc. On the other hand, the critical crack length evaluating routine 59 evaluates, from fracture toughness etc., a critical crack length leading to fracture based on the evaluation result of material deterioration during the period of use. Further, based on the above evaluation results, the countermeasure evaluating routine 56 evaluates the necessity of any security action, a proper candidate for a preventive maintenance 60 (hydrogen injection, surface improvement, or repair/welding) and the implementation time thereof, as well as the resultant effect. The evaluation result is indicated on the display screen 48. As shown at one exemplified screen 48a, the period till a time $t_1$ represents a crack incubation time, and a time $t_2$ at which the crack propagation length 58 intersects the critical crack length 59 corresponds to the life. Then, a time $t_3$ corresponds to the extended life after the preventive maintenance 60.

By displaying the evaluation result as described above, there can be obtained advantages of enabling operators to visually understand the necessity, urgency and effectiveness of a preventive maintenance, and to get a support for proper judgment. In addition, reliability of the residual life evaluation is improved since the material degradation is quantitated depending on the personality of the plant.

A description will now be made of a practical example of the material residual life evaluation. The residual life evaluation is performed in two stages concerned with the crack generation behavior (crack incubation time evaluation) and the crack propagation behavior (crack propagation length evaluation). The crack incubation time is generally longer than a period in which the crack propagation leads to fracture, and is most important in the material residual life evaluation. For the crack incubation time, the method of evaluating generation possibility of a stress corrosion crack (SCC) proposed by Yamauchi, et al. (38-th Fushoku-Boshoku Toronkai (Corrosion and Anticorrosion Meeting), October 1991) can be utilized. Specifically, the relationship among a crack incubation time $\tau i$ determined by an experiment under accelerated condition for each of degradations, a crack incubation time $\tau s$ determined under reference condition, and an acceleration factor $Fi$ in material deterioration, i.e., $\tau i = \tau s \times Fi$ (where n=1, 2, 3 ..., n).

When a plurality of degradations exist, a crack incubation time $\tau$ can be expressed as Equation 1 below. Also, a material deterioration acceleration factor F can be expressed as Equation 2 below, i.e., the product of the acceleration factors Fi:

$$\tau = \tau s \times F \qquad (1)$$

$$F = \prod_{i=1}^{n} (Fi) \qquad (2)$$

A reference time for the crack incubation time is defined, for example, as the time until the crack length reaches 50 μm. If the material deterioration acceleration factor is standardized such that the crack incubation time $\tau$ is one year at F=1, the material deterioration acceleration factor F itself can be regarded as the crack incubation time. The material deterioration acceleration factor is defined on an assumption that a material stays under constant conditions, so that changes in the plant operating conditions are taken in as follows in the actual plant.

It is assumed that plant operation starts with normal water chemistry and that F value of an apparatus to be evaluated is 10, i.e., a 50 μm crack is expected to appear in 10 years. It is also assumed that after 7 years, the operating conditions are changed to Hydrogen water chemistry by hydrogen injection and F is changed to F=50 under this environment. In this case, 7/10 of F=10 has been consumed under the old environment after the elapse of 7 years, and the residual life under the new environment is expressed by F=50×(3/10)=15. Thus, it is predicted that a crack having a length of 50 μm will appear 15 years later. In this way, by utilizing the data in the plant chart and taking into account changes in the plant operating conditions in the integral form, the crack incubation time of each component apparatus of the plant.

From the viewpoint of ensuring safety of the plant, it is desirable to perform the residual life evaluation based on prediction of only the crack incubation time. Particularly in the nuclear power plant, the presence of a crack is not allowed. However, the above-described evaluation using the material deterioration acceleration factor is not free from a prediction error due to utilization of the acceleration experimental data. The longer the prediction period, the greater is an absolute value of the error. On the other hand, if a safety factor in consideration of the error is set to be too large, the above-described purpose of avoiding the preventive maintenance which is neither necessary nor urgent cannot be sufficiently achieved. Furthermore, when the abnormality diagnosing system of the present invention has not yet been installed at start-up of the plant operation and is introduced after the plant operation, the crack propagation may have been already actualized.

Accordingly, predicting all of the crack generations until actualization of microscopic cracks is thought to be practically difficult, and hence evaluation of the crack propagation behavior is also important in the residual life evaluation. In this case, a crack whose length is larger than a detection limit is detected during inspection and check. The detection limit of the crack length is approximately 1 mm. An important point in the residual life evaluation when a crack is detected is the crack propagation rate. How the crack propagation rate will change in future is evaluated using the data in the plant chart.

For a stress corrosion cracking (SCC), several models adapted for, e.g., an active dissolution at the crack tip are proposed, and the data required for evaluation, such as a strain rate at the crack tip, are taken out of the plant chart. In the case where the plant chart data before introduction of the abnormality diagnosing system are not present, the record until the present time is estimated as with the future estimation, and the crack propagation rate is evaluated based on the estimated record. While the above description is made in connection with the SCC in a nuclear power plant, SCC's in other plants and other deterioration mechanisms such as fatigue cracking can also be handled in a like manner.

In the above-described embodiment, the crack propagation behavior in the reactor internals of the nuclear power plant is evaluated by separating the behavior into two stages of generation and propagation. However, the evaluation may be performed by further dividing each of the generation and the propagation into, e.g., generation and coalescence of microscopic cracks, or by correlating them depending upon the evaluation accuracy of a residual life and the material deteriorating mechanism. This is similarly applied to the material degradations described above in connection with FIG. 14. In other words, the material degradations are omitted, selected and added at need.

Figure 15:
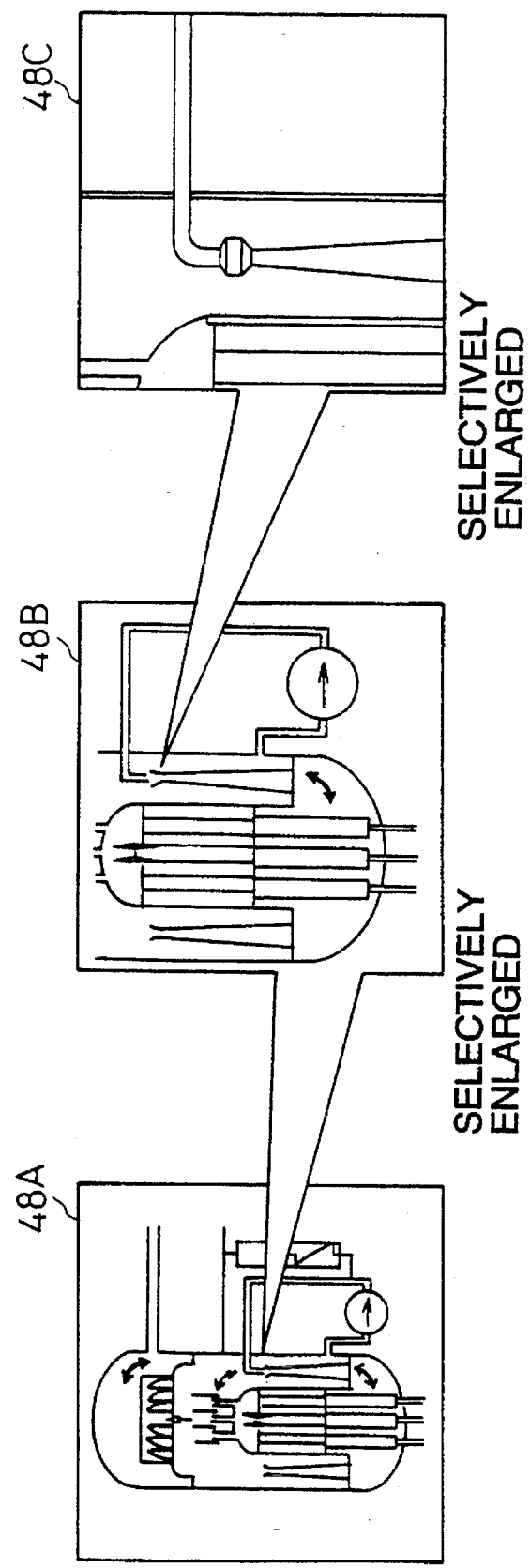
FIG. 15 is an illustration showing details of the embodiment of FIG. 14.
Figure 16:
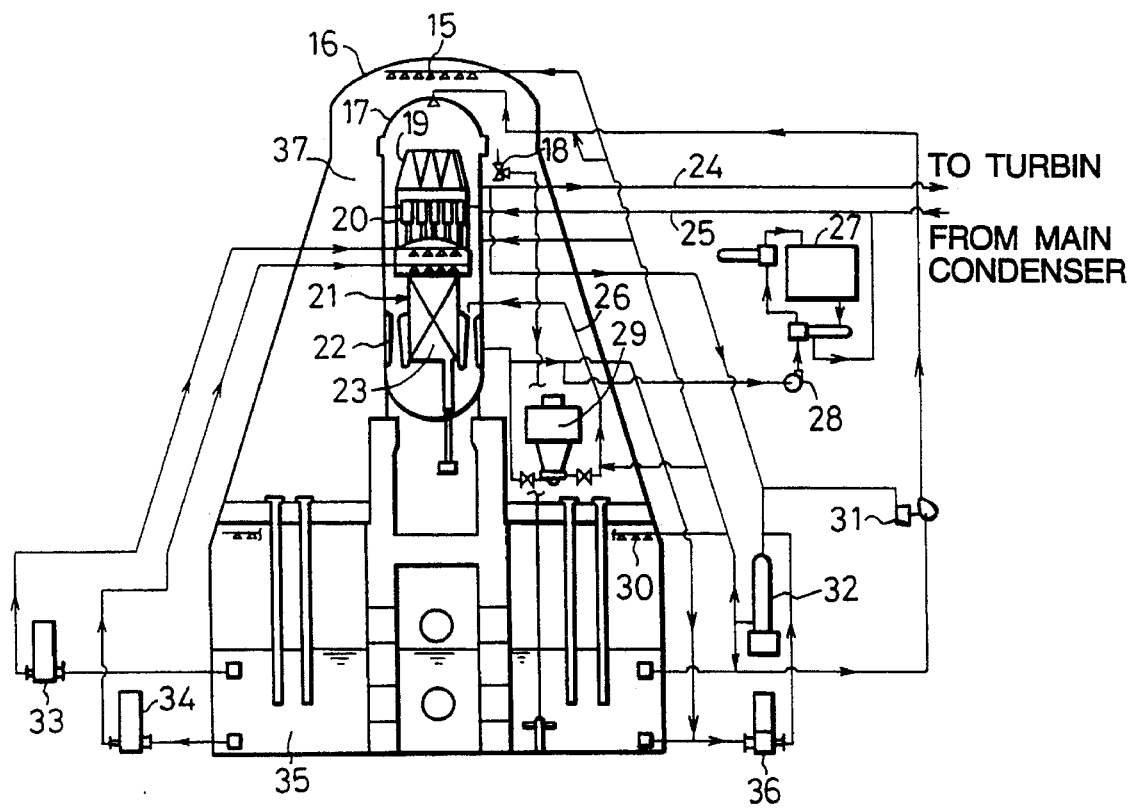
FIG. 16 is a schematic structural view of a boiling-water reactor power plant.

In selecting the location to be evaluated and the countermeasure, by carrying on a dialogue through a display, the evaluation can be performed while visually confirming all of the procedures. When the location to be evaluated is selected in a plant structure image on the display screen using a pen, a mouse or the like, the items to be confirmed, such as the apparatus/member name and the material name, are displayed. Upon confirming the items, as shown in FIG. 15, an enlarged image of the selected location and its vicinity is displayed in an increasing enlarged scale, e.g., in order of 48A to 48B to 48C. By so repeating the step of confirming the items such as the apparatus/member name and the material name, the objective apparatus/member is finally selected. By gradually enlarging the location to be evaluated, it is possible to clarify which portion of the objective apparatus/member is subject to problematic deterioration and how the situation is improved by which countermeasure. Of course, by displaying and reviewing an entire image of the plant, soundness of the whole plant can be grasped.

The place where the residual life evaluating system is installed is not limited to a central control room of the plant.

Generally, with a possibility of material deterioration progressing quickly being small as opposed to an apparatus abnormality, if the plant periodical inspection is surely performed, the evaluation result is often only required to be available in determining a relatively long-term action such as a maintenance program till the next periodical inspection or the periodical inspection after the next. The information resulted in such a case is not to be handled by plant operators. Therefore, the residual life evaluating system may be installed in an other plant facility, e.g., a preventive maintenance center, so that a maintenance program including, e.g., how to ensure apparatus and materials used in repair/replacement of the apparatus/members to be dealt with by the maintenance program, equipment required for engineering, and persons can be determined in coordination with maintenance programs for other plants. This enables the long-term plant security to be achieved while making best use of resources including manpower.

While the above embodiments are described as applying the present invention to a nuclear power plant, the invention is also applicable to other facilities, such as various types of thermoelectric power plants and chemical plants for producing ethylene, in addition to the nuclear power plant.

The present invention arranged as described hereinabove has the following advantages.

In the plant monitoring and diagnosing method, a plant operating condition, an apparatus operating condition and an environment condition are detected, detection data are accumulated, plant inspection data are accumulated, and the plant condition is diagnosed based on plant record information consisted of the accumulated detection data and inspection data. Therefore, it is possible to realize the plant monitoring and diagnosing method which can exactly analyze and diagnose an abnormality with high reliability, taking into account the production record, the check/repair record and the operation record of a plant, and can simplify the periodical inspection, resulting in a higher availability factor of the plant.

Also, in the plant monitoring and diagnosing system, the system comprises a first input section for receiving detection data of a plant operating condition, an apparatus operating condition and an environment condition, a second input section for receiving plant inspection data, a first input data processing section for preparing data for use in plant monitoring and diagnosis based on the detection data from the first input section, a second input data processing section for preparing data for use in plant monitoring and diagnosis based on the inspection data from the second input section, a plant chart for storing the data prepared by the first and second input data processing sections, and a monitoring and diagnosing section for monitoring and diagnosing the plant condition based on the data stored in the plant chart. Therefore, it is possible to realize the plant monitoring and diagnosing system which can exactly analyze and diagnose an abnormality with high reliability, taking into account the production record, the check/repair record and the operation record of a plant, and can simplify the periodical inspection, resulting in a higher availability factor of the plant.

What is claimed is:

1. A method of monitoring and diagnosing plant conditions comprising the steps of:

detecting and accumulating plant operating conditions, apparatus operating conditions and environment conditions;

inputting and accumulating plant inspection data; and monitoring and diagnosing said plant conditions based on plant record information including said accumulated detection data and inspection data;

wherein said inputting and accumulating plant inspection data comprises:

inputting a first set of detection data of a first type relating to a given characteristic of a plant element to be diagnosed, and inputting a second set of detection data of a second type relating to said given characteristic but different from said first type of detection data; and wherein said diagnosing comprises:

determining a correlation between said first set of detection data; calibrating said determined correlation using said second set of detection data; and storing said calibrated correlation as a plant chart for monitoring and diagnosis; and comparing said calibrated correlation stored as a plant chart and a correlation of a third set of detection data, said third set of detection data being of said first type.

2. A method of monitoring and diagnosing plant conditions comprising the steps of:

detecting and accumulating plant operating conditions, apparatus operating conditions and environment conditions;

inputting and accumulating plant inspection data; and monitoring and diagnosing said plant conditions based on plant record information including said accumulated detection data and inspection data;

wherein said plant record information is stored in the form of a plant chart in which said detection data and said inspection data are compressed and accumulated, and the plant conditions are diagnosed based on the data in said plant chart; and wherein said detection data and said inspection data each comprise plural kinds of data, these plural kinds of data are given with predetermined weights before the plant conditions are monitored and diagnosed, these predetermined weights are changed in accordance with the result of diagnosing the plant conditions, and these changed detection data and said inspection data are compressed and stored as the data in said plant chart;

and wherein one of said plural kinds of detection data relates to a given operating condition;

and further comprising:

determining a first plurality of values of said given operating condition for the respective different detection data using said inputted plurality of detection data; and storing correlations of said first plurality of values of said given operating condition as said plant chart for monitoring and diagnosis; and wherein said diagnosing comprises comparing said correlation of said first plurality of values of said given operating condition stored as said plant chart and correlations of a second plurality of values of said given operating condition for the respective different detection data determined using a second plurality of values of said plurality of different detection data to monitor and diagnose an abnormality in a plant element relating to said operating condition.

3. A method of monitoring and diagnosing plant conditions according to claims 1 or 2, wherein said first step further includes a step of inputting inspection data from a plant; and taking said inspection data into consideration to determine said correlation as a plant chart for monitoring and diagnosis.

4. A method of monitoring and diagnosing plant conditions according to claims 1 or 2, wherein when an abnormality is detected in said first step, an abnormal location and abnormal details are identified and an event which will ensue from the abnormality is predicted.

5. A method of monitoring and diagnosing plant conditions according to claim 4, wherein said identified abnormal location and details and said event which will ensue from the abnormality are indicated by display means.

6. A method of monitoring and diagnosing plant conditions according to claim 4, wherein a countermeasure for dealing with the detected abnormality is selected, and said identified abnormal location and details, said event which will ensue from the abnormality, and a countermeasure are indicated by display means.

7. A method of monitoring and diagnosing plant conditions according to claims 1 or 2, wherein a residual life for said plant element is evaluated based on the data in the plant chart and material degradation data calculated from the plant chart data.

8. A method of monitoring and diagnosing plant conditions according to claim 7, wherein an effect of crack propagation is evaluated based on the data in the plant chart, the inspection data, and the material degradation data, in terms of crack incubation time until microscopic cracks coalesce to become a macroscopic crack, a propagation length of the macroscopic crack, and a critical crack length which reflects deterioration of the material strength, thereby evaluating a residual life for said plant element.

* * * * *